US006536935B2

(12) United States Patent
Parunak et al.

(10) Patent No.: US 6,536,935 B2
(45) Date of Patent: *Mar. 25, 2003

(54) COMPUTERIZED SYSTEM FOR MARKET-BASED CONSTRAINT OPTIMIZATION

(75) Inventors: H. Van Dyke Parunak; John A. Sauter; Allen C. Ward, all of Ann Arbor, MI (US)

(73) Assignee: Atarum Institute, Ann Arbor, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 120 days.

(21) Appl. No.: 08/898,989

(22) Filed: Jul. 23, 1997

(65) Prior Publication Data

US 2002/0013631 A1 Jan. 31, 2002

(51) Int. Cl.[7] .............................................. G05B 13/02
(52) U.S. Cl. ............................ 364/148.01; 364/468.09; 364/153; 364/488; 705/7; 706/45; 706/919
(58) Field of Search ........................ 364/148.01–148.05, 364/153, 154, 156, 468.01, 468.03, 468.09, 468.1, 488, 578; 705/7–10, 37, 400; 707/104; 706/19, 45–47, 919–923, 10

(56) References Cited

U.S. PATENT DOCUMENTS

| | | | | |
|---|---|---|---|---|
| 5,394,324 A | * | 2/1995 | Clearwater | 705/8 |
| 5,504,837 A | * | 4/1996 | Griffeth et al. | 706/10 |
| 5,572,430 A | * | 11/1996 | Akasaka et al. | 364/468.01 |
| 5,617,514 A | * | 4/1997 | Dolby et al. | 706/45 |
| 5,873,071 A | * | 2/1999 | Ferstenberg et al. | 705/37 |
| 5,953,229 A | * | 9/1999 | Clark et al. | 700/100 |

OTHER PUBLICATIONS

JyiShane Liu and Katia P. Sycara, *Collective Problem Solving through Coordinated Reaction*, IEEE International Conference on Evolutionary Computation, Orlando, Florida, Jun. 1994, pp. 1–4.

Robert Axtell and Joshua Epstein, *Distributed Computation of Economic Equilibria via Bilateral Exchange*, Brookings Institution and Santa Fe Institute, pp. 1–25, Mar. 1997.

JyiShane Liu and Katia P. SYcara, *Distributed Constraint Satisfaction through Constraint Partition and Coordinated Reaction*, Proceedings of the 12th International Workshop on Distributed Artificial Intelligence, Hidden Valley, PA., May 1993, pp. 1–16.

Makoto Yokoo et al., *Distributed Constraint Satisfaction for Formalizing Distributed Problem Solving*, 12th IEEE International Conference on Distributed Computing Systems, 1992, pp. 614–621.

(List continued on next page.)

Primary Examiner—Leo Picard
Assistant Examiner—Steven R. Garland
(74) Attorney, Agent, or Firm—Gifford, Krass, Groh, Sprinkle, Anderson & Citkowski, P.C.

(57) ABSTRACT

An apparatus for determining assignments to attributes (e.g., electrical power or overall dimensional size) of components within a system. A computerized constraint network is constructed which uses constraint agents, variable agents, and task agents in order to make assignments to the attributes of the components based upon market-based constraint optimization techniques. The attributes have variables indicative of the assignments to the attributes. Constraint data structures assist the agents in determining permissible assignments for the variables. The constraint data structures use preferential rules for determining the assignments to the variables. The preferential rules indicate which assignments for the variables of the agents produce higher utility and lower cost.

65 Claims, 13 Drawing Sheets

OTHER PUBLICATIONS

David C. Brown, et al., *The Application of Multiagent Systems to Concurrent Engineering*, Concurrent Engineering: Research and Applications, Mar. 1996, pp. 2–5.

S. Balasubramanian, et al., *A Multiagent Architecture for Concurrent Design, Process Planning, Routing and Scheduling*, Concurrent Engineering: Research and Application, Mar. 1996, pp. 7–16.

Ilan Berker, et al., *Conflicts and Negotiation in Single Function Agent Based Design Systems*, Concurrent Engineering: Research and Applications, Mar. 1996, pp. 17–33.

Aoife Cox et al., *SBD System Design*, Concurrent Engineering: Research and Applications, Mar. 1996, pp. 35–46.

Joseph D'Ambrosio et al., *Hierarchical Concurrent Engineering in a Multiagent Framework*, Concurrent Engineering: Research and Applications, Mar. 1996, pp. 47–57.

Susan E. Lander et al., *Designing Integrated Engineering Environments: Blackboard–Based Integrated of Design and Analysis Tools*, Concurrent Engineering: Research and Applications, Mar. 1996, pp. 59–71.

James F. Peters, III et al., *Coordination of Multiagent Systems with Fuzzy Clocks*, Concurrent Engineering: Research and Applications, Mar. 1996, pp. 73–87

M. Sobolewski, *Multiagent Knowledge–Based Environment for Concurrent Engineering Applications*, Concurrent Engineering: Research and Applications, Mar. 1996, pp. 89–97.

Bernard A. Nadel, *Constraint satisfaction algorithms*, Computer Science Department, Wayne State University, Detroit, Michigan, Jan. 1988, pp. 188–224.

Michael P. Wellman, *A Computational Market Model for Distributed Configuration Design*, extended version of a paper originally appearing in Proceedings of the Twelfth National Conference on Artificial Intelligence, Seattle, Washington, Aug. 1994, pp. 1–12, Revised Version of Jul. 1994.

Joseph D'Ambrosio et al., *Constraint Satisfaction Approach for Multi–Attribute Design Optimization Problems*, Proceedings of DETC'97: 1997 ASME Design Engineering Technical Conferences, Sacramento, California, Sep. 1997, pp. 1–10.

Rlna Dechter, *Constraint Satisfaction*, Encyclopedia of Artificial Intelligence, 1992, pp. 285–293.

K. Sycara et al., *Distributed Constrained Heuristic Search*, IEEE Transactions on Systems, Man, and Cybernetics, vol. 21, No. 6, Nov./Dec. 1991, pp. 1446–1461.

JyiShane Llu et al., *Distributed Problem Solving through Coordination In a Society of Agents*, Robotics Institute School of Computer Science, Carnegie Mellon University, Pittsburgh, Pennsylvania, 13th International Workshop on Distributed Artificial Intelligence, 1994.

Rina Dechter et al., *Network–Based Heuristics for Constrain–Satisfaction Problems*, Artificial Intelligence, Elsevier Science Publishers B.V., 1998, pp. 1–38.

JiyShane Liu et al., *Exploiting Problem Structure for Distributed Constraint Optimization*, appeared in Proceedings of the First International Conference on Multiagent Systems, San Francisco, California, Jun. 1995.

Khaled Ghedira et al., *A Multi–Agent Model for the Resource Allocation Problem: a Reactive Approach*, 10th European Conference on Artificial Intelligence, 1992, pp. 252–254.

Vipin Kumar, *Algorithms for Constraint Satisfaction Problems: A Survey*, appeared in AI Magazine 13(1):32–44, 1992, pp. 1–27.

Edmund H. Durfee, *Trends in Cooperative Distributed Problem Solving*, IEEE Transactions on Knowledge and Data Engineering, vol. 1, No. 1, Mar. 1989, pp. 63–83.

Michael N. Huhns et al., *Multiagent Truth Maintenance*, IEEE Transactions on Systems, Man, and Cybernetics, vol. 21, No. 6, Nov./Dec. 1991, pp. 1437–1445.

* cited by examiner

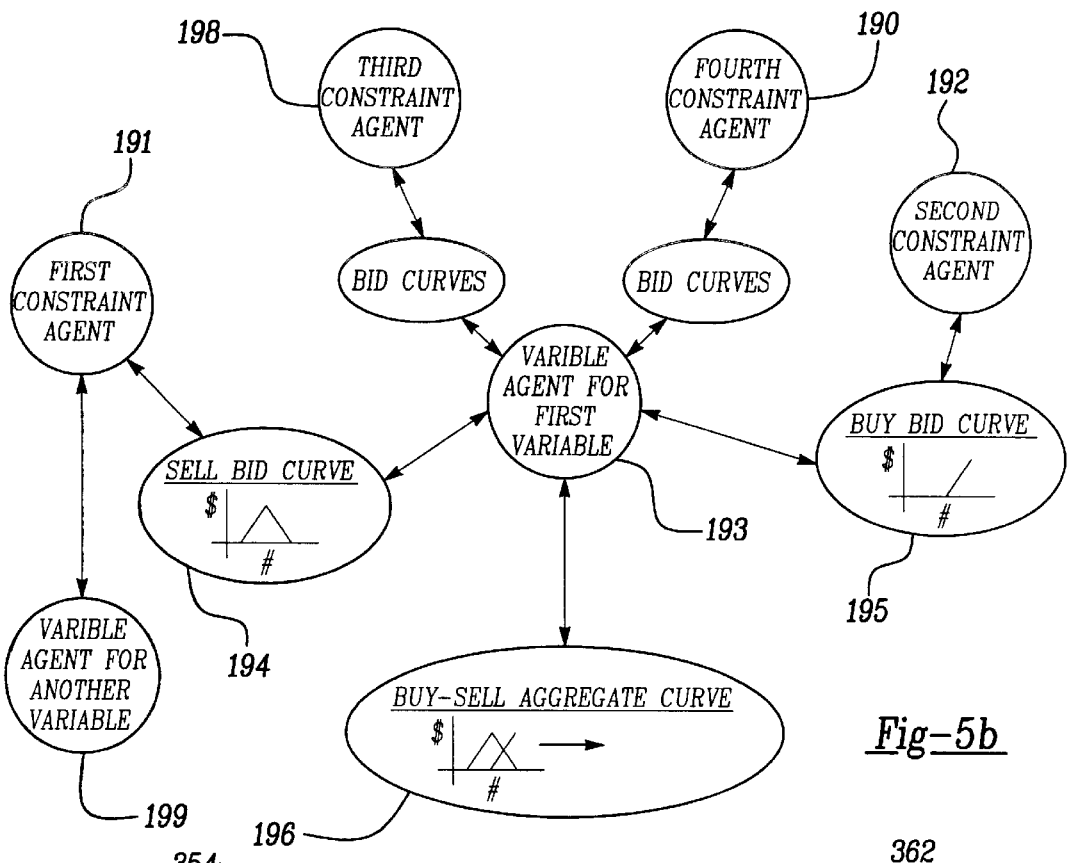
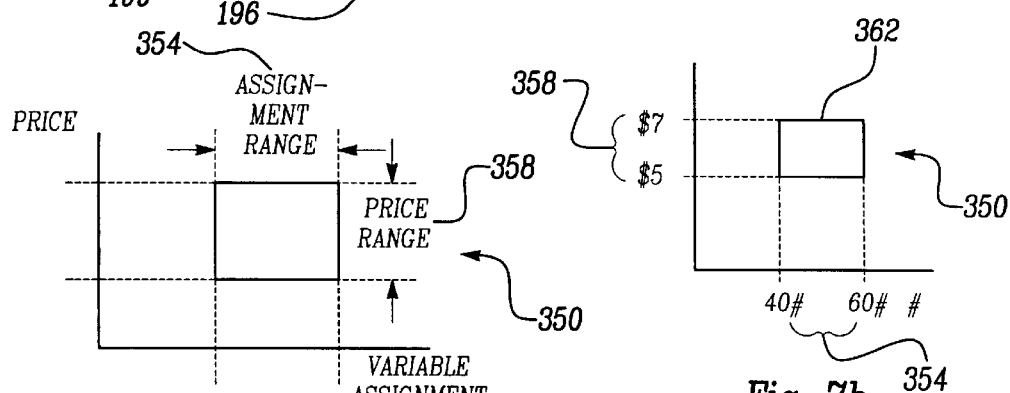
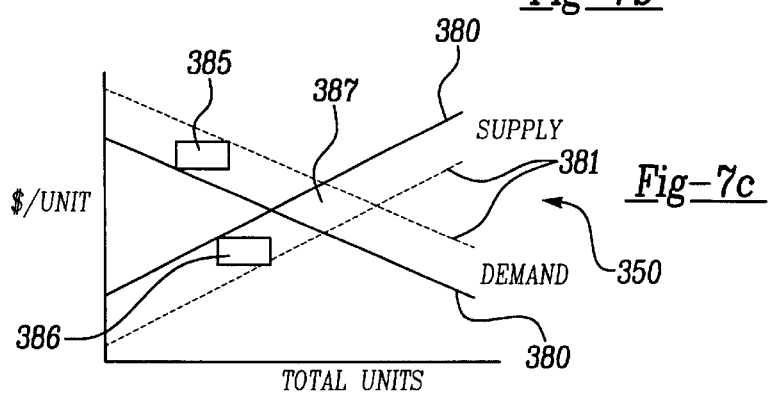

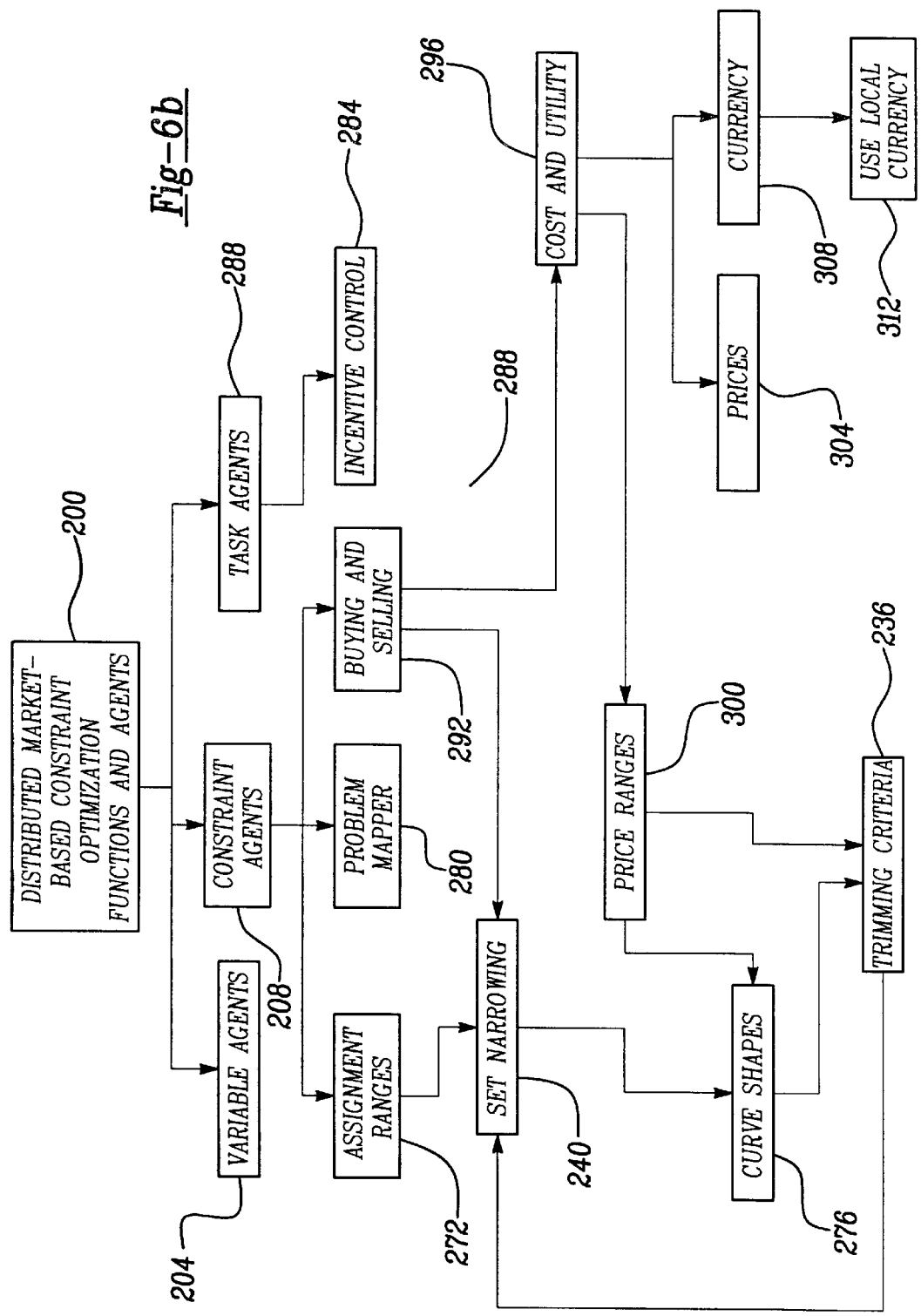

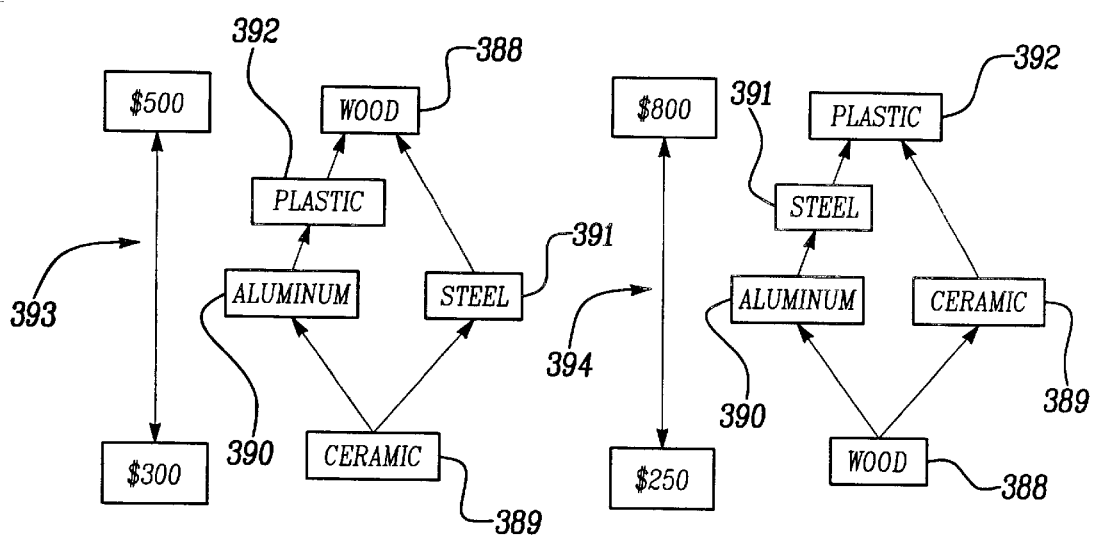
*Fig-7d*  *Fig-7e*
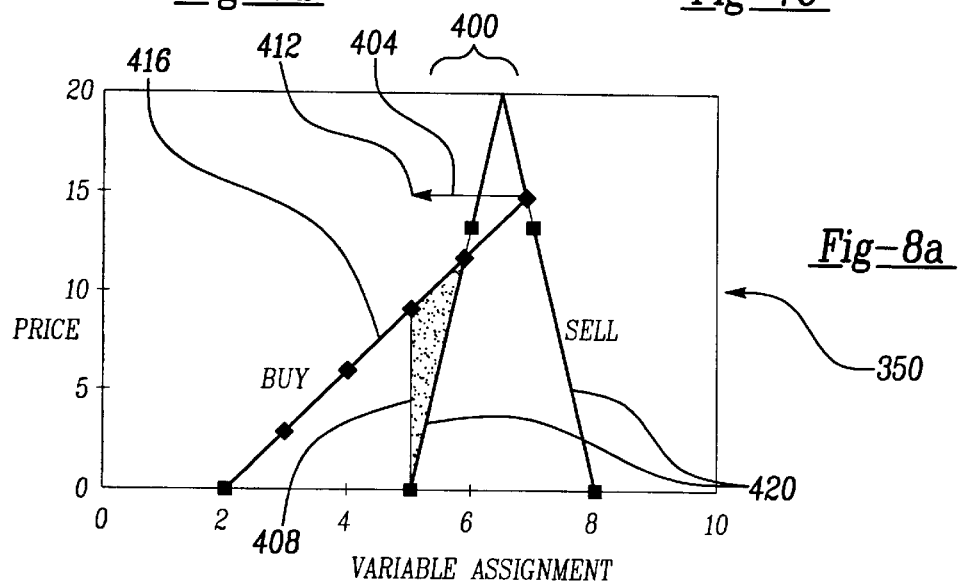
*Fig-8a*
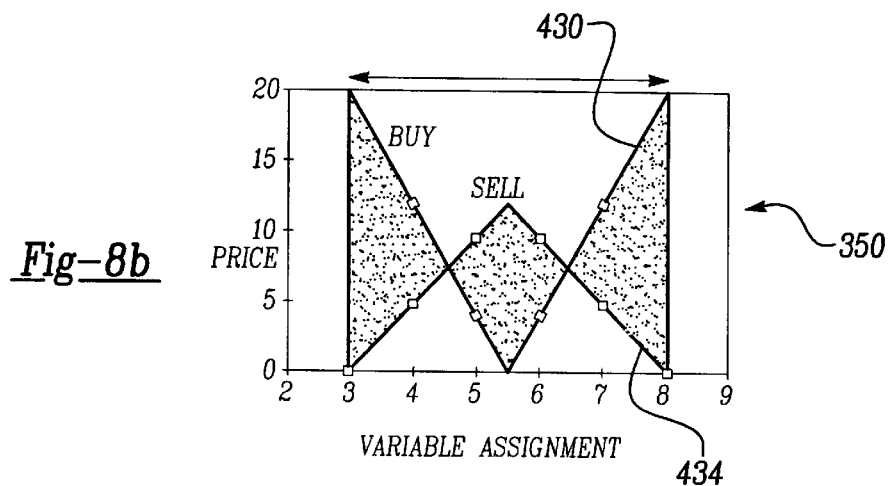
*Fig-8b*

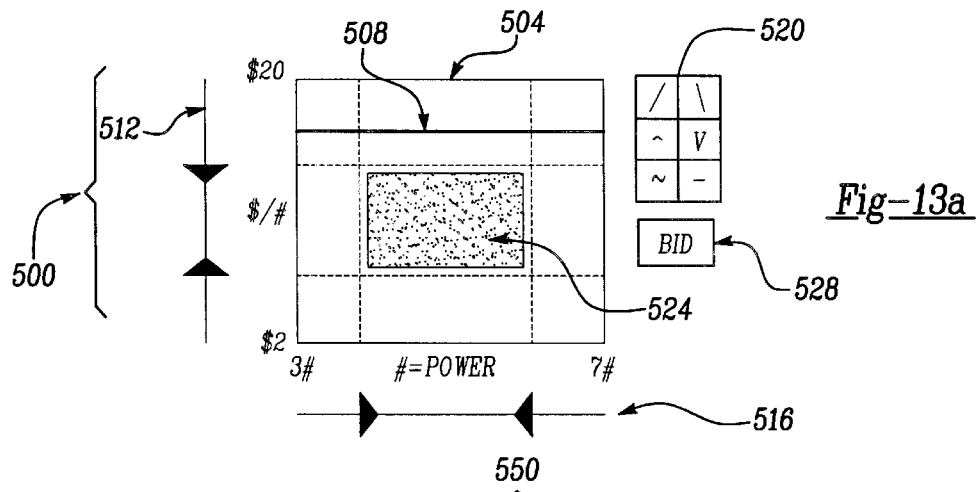
_Fig-13a_
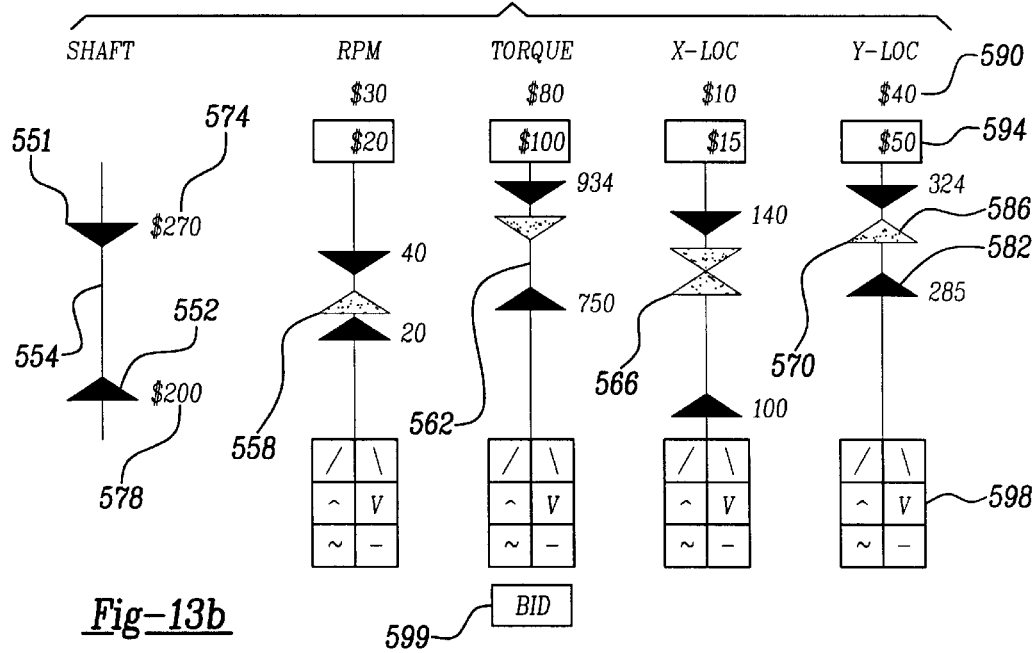
_Fig-13b_
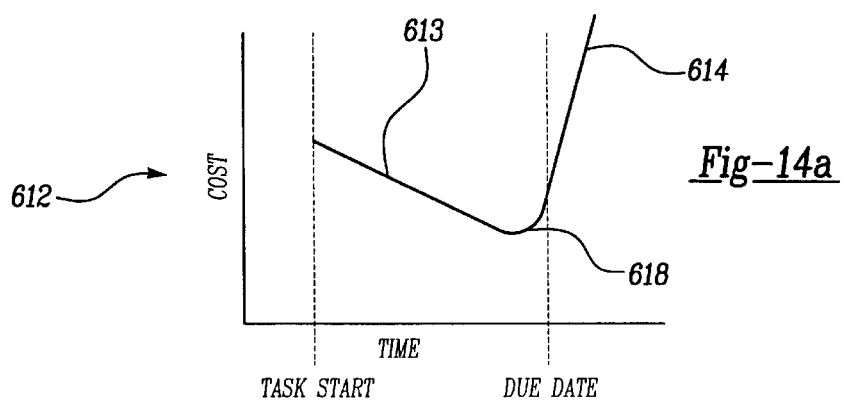
_Fig-14a_

| CHIEF ENGINEER REQUIRES | | | | 1 SUPPLY | | | |
|---|---|---|---|---|---|---|---|
| | MIN. | MAX. | | | MIN. | MAX. | |
| OUTPUT TORQUE: | 600 | 1600 | IN-LB | OUTPUT TORQUE: | 92 | 3,609 | IN-LB |
| OUTPUT RPM: | 30 | 65 | RPM | OUTPUT RPM: | 19 | 42 | RPM |
| OUTPUT HP: | 0 | 0 | HP | OUTPUT HP: | 0.04 | 1.67 | HP |

601 — 602

603 — MY PRICE FOR DRIVE TRAIN

| | MIN. | MAX. | |
|---|---|---|---|
| PRICE OF WEIGHT: | $0.43 | $3.42 | $/LB |
| PRICE OF X: | $0.09 | $0.19 | $/IN |
| PRICE OF Y: | $0.00 | $0.00 | $/IN |
| PRICE OF Z: | $0.16 | $0.60 | $/IN |
| COST OF DRIVE TRAIN: | $273.17 | $1,103.42 | |
| COST OF WEIGHT: | $10.36 | $393.30 | |
| COST OF SPACE: | $2.19 | $10.26 | |
| TOTAL DRIVE TRAIN COST: | $285.72 | 1,506.95 | |

608

ASSEMBLY

| | | | | | | | | | | | | | | |
|---|---|---|---|---|---|---|---|---|---|---|---|---|---|---|
| LOWER BOUND | 1 | | | | | | 0 | | 0.00 | | | | | |
| UPPER BOUND | | | | | | | 2 | 43 | 3800.00 | $1,500 | | | | |
| MIN VALUE: | 1 | | | | | 6Z439 | 2M187 | 0 | 0.04 | 19 | 92 | $273 | 14.47 | 4.23 | 5.75 | 24 |
| MAX VALUE: | 46 | | | | | 6Z440 | 6Z553 | 2 | 1.67 | 42 | 3,609 | $1,103 | 27.36 | 8.21 | 6.44 | 115 |

TEMPLATE

| | 1 | | | | | | | | | | | | | | |
|---|---|---|---|---|---|---|---|---|---|---|---|---|---|---|---|
| 46 | ASSEMBLY NUMBER | SELECT | TRANSMISSION IN OR OUT | MOTOR IN OR OUT | TRANSMISSION PART NUMBER | MOTOR PART NUMBER | OUTPUT HP | OUTPUT FULL-LOAD RPM | COMPUTED NOMINAL TORQUE (IN-LB) | PRICE | LENGTH (S) | WIDTH (Y) | HEIGHT (Z) | WEIGHT (LBS) |
| 1 | 24 | 1 | 1 | 1 | 6Z440 | 4Z140 | 0.07 | 30 | 144 | $287 | 15.03 | 4.23 | 5.75 | 31 |
| 1 | 25 | 1 | 1 | 1 | 6Z440 | 4Z528 | 0.09 | 30 | 192 | $295 | 16.13 | 4.23 | 5.75 | 32 |
| 1 | 26 | 1 | 1 | 1 | 6Z440 | 2M167 | 0.14 | 29 | 301 | $349 | 17.06 | 6.50 | 8.06 | 39 |
| 1 | 27 | 1 | 1 | 1 | 6Z440 | 2M501 | 0.14 | 29 | 301 | $364 | 17.16 | 6.50 | 8.44 | 43 |
| 1 | 28 | 1 | 1 | 1 | 6Z440 | 2M509 | 0.19 | 29 | 401 | $376 | 17.44 | 6.50 | 8.06 | 40 |
| 1 | 29 | 1 | 1 | 1 | 6Z440 | 2M502 | 0.19 | 29 | 401 | $392 | 18.16 | 6.50 | 8.44 | 48 |
| 1 | 30 | 1 | 1 | 1 | 6Z440 | 2M168 | 0.28 | 29 | 602 | $384 | 19.44 | 6.50 | 8.06 | 47 |
| 1 | 31 | 1 | 1 | 1 | 6Z440 | 2M503 | 0.28 | 29 | 602 | $399 | 19.54 | 6.50 | 8.44 | 51 |

606 — 607

COMPUTERIZED SYSTEM FOR MARKET-BASED CONSTRAINT OPTIMIZATION

BACKGROUND AND SUMMARY OF THE INVENTION

The present invention relates generally to computer-implemented attribute assignment determinators. More particularly, the invention relates to a computer-implemented apparatus and method for determining assignments based upon constraint optimization techniques.

Design of a system involves tradeoffs which need to be optimized. A designer seeks to embed a set of functions (e.g., optical, electromechanical, control) in an artifact or item with specified attributes (e.g., weight, color, complexity, materials, power consumption, physical size). Conflicts arise when different teams disagree on the relationship between attributes of their own functional pieces and the attributes of the entire product. Some conflicts are within the design team: how much of a mechanism's total power budget should be available to the sensor circuitry, and how much to the actuator? Others face design off against other manufacturing functions: how should the functional desirability of an unusual machine shape be balanced against the increased manufacturing expense of creating that shape?

It is typically straightforward to represent how much a mechanism weighs or how much power it consumes, but there is seldom a disciplined way to trade-off weight and power consumption against one another. Moreover, the more attributes that are involved in a design compromise, the more difficult the trade-off becomes. The problem is the dilemma of multi-variant optimization. Analytical solutions are currently available only in specialized and limited niches. In current practice, such trade-offs are sometimes supported by processes such as QFD (Quality Functional Deployment) or resolved politically rather than in a way that optimizes the overall design and its manufacture ability.

Moreover, several current approaches use a centralized approach to optimize the overall design of a system. The centralized approach suffers several disadvantages on a number of points, including communication delays between the central decision point and the system components, and the computational complexity of decision-making over a large number of variables.

The apparatus and method of the present invention uses a novel distributed market-based constraint optimization technique to, among other things, set prices on alternative assignments to the various attributes of a design. Agents (either computerized or with human intervention) representing each component buy and sell units of these attributes. A component that needs more latitude in a given attribute (e.g., more weight) can purchase increments of that attribute from another component, but may need to sell another attribute to raise resources for this purchase. In some cases, analytical models of the dependencies between attributes may assist designers in estimating their relative cost, but even where such models are clumsy or nonexistent, prices set in the marketplace define the coupling among the attributes.

The apparatus and method of the present invention make assignments to attributes of components within a system. The attributes have variables indicative of assignments to the attributes. A first constraint data structure is used for determining a preferential set of assignments to a first variable. The first variable is indicative of an assignment to a first attribute of a first component. The first constraint data structure has first preferential rules for determining preferential assignments to the first variable. A first computer module is connected to the first constraint data structure for determining bid data based upon the first preferential rules. The bid data contains price data associated with a first preferential set of assignments to the first variable. The first variable is assigned a value based upon the bid data.

For a more complete understanding of the invention, its objects and advantages, reference may be had to the following specification and the accompanying drawings.

BRIEF DESCRIPTION OF THE DRAWINGS

FIGS. 5a–5b are entity relationship diagrams showing the relationships involved in the constraint network of the present invention;

FIGS. 6a–6b are structure charts of the agents and operations involved in the present invention;

FIGS. 7a–7c are x-y graphs illustrating exemplary inter-relationships between price and variable assignment within the context of the present invention;

FIGS. 7d–7e are Directed Acyclic Graphs illustrating the use of nominal variables with the present invention;

FIG. 8a is an x-y graph illustrating an exemplary inter-relationship between price and variable-assignment for a buy curve shape of "/" and a sell curve shape of "^";

FIG. 8b is an x-y graph illustrating an exemplary inter-relationship between price and variable assignment for a situation of region splitting;

FIG. 13a is a computer-human interface illustrating the "additive" interface of the present invention;

FIG. 13b is a computer-human interface illustrating the "base+attribute" interface of present invention;

FIG. 13c is a computer-human interface illustrating preference selection for bidding;

FIG. 14a is an x-y graph illustrating the interrelationship between cost and time in delaying a task.

DESCRIPTION OF THE PREFERRED EMBODIMENTS

Figure 1:
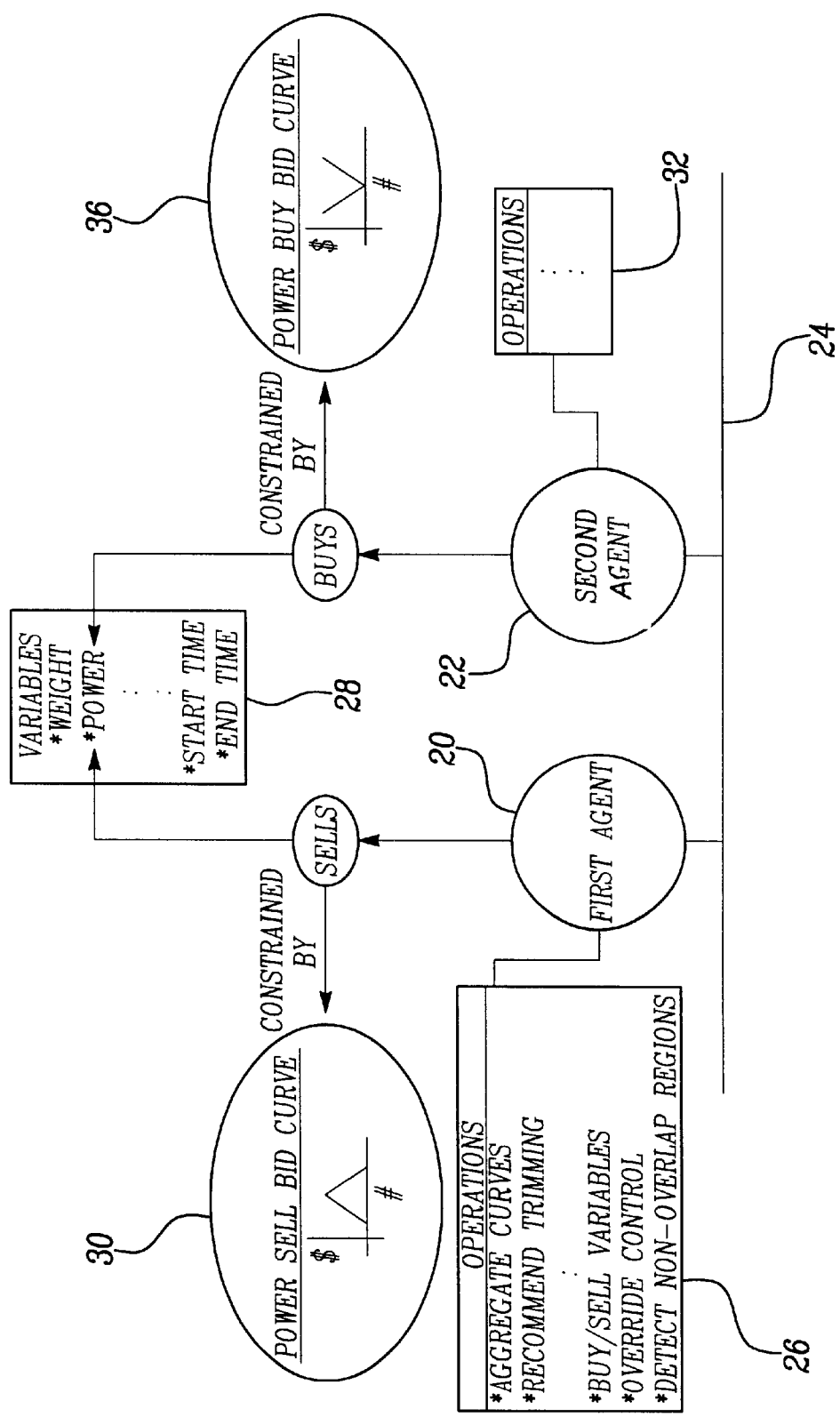
FIG. 1 is a system flow diagram showing top-level data flow and operations of the present invention.

FIG. 1 shows a top-level system diagram wherein a first agent 20 communicates with a second agent 22 over a communication layer 24 in order to negotiate over variables 28. Variables represent the attributes and their assignments for one or more components within the present invention.

Agents 20 and 22 each have operations 26 and 32 which they can use upon variables 28. First agent 20 can use operations 26 to, among other things, negotiate with second agent 22 the buying and selling of variables 28. Operations 26 performed upon variables 28 are subject to constraints, such as, for example: constraint 30 which imposes preferential rules for the selling bids of the power variable by first agent 20; and constraint 36 which imposes preferential rules for the buying bids of the power variable by second agent 22.

The preferred embodiment used the Microsoft Visual J++ computer programming language in order to implement the agent structure of the present invention. The agents of the preferred embodiment have their own individual threads of control and preferably communicate through JAVA scripts using the hypertext transfer protocol ("http"). However, it is to be understood that the present invention is not limited to only agent technology but includes other forms of implementation, including, but not limited to, those implementations where the computer objects which perform operations upon the variables do not have their own individual threads of control, such as, non-agent objected oriented technology or structured programming languages (e.g., FORTRAN or Pascal). Moreover, the preferred embodiment utilizes computer-human interfaces for human involvement with the negotiation process. The following software libraries which were obtained from RogueWave were used to develop the computer-human interfaces: JWidgets and JTools.

Below are exemplary scenarios and applications of the present invention.

Product Design Scenario

Figure 2A:
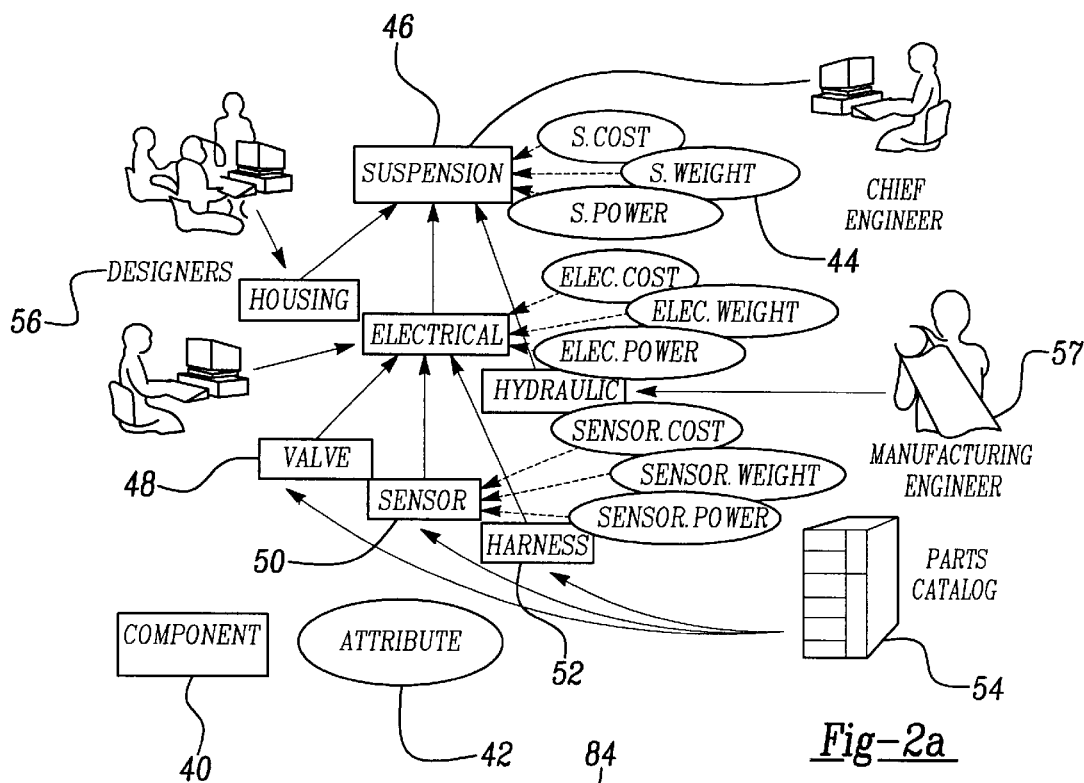
FIG. 2a is a flow diagram showing agents involved in an example of designing vehicle suspension system.

FIG. 2a shows a non-limiting example of the present invention being used in the design of a new vehicle suspension system. The present invention decomposes the design into components which have accompanying attributes. Components are represented on FIG. 2a by the shape indicated at reference numeral 40. Attributes are represented on FIG. 2a by the shape indicated at reference numeral 42. For example, the suspension weight attribute 44 might represent the constraint that the entire product (or item) should weigh between five and ten kilograms.

The top-most component 46 represents the complete product (in this case, a new suspension for a vehicle). The bottom-most components (i.e., valve component 48, sensor component 50, and harness component 52) are either, in this example, custom-manufactured or selected from an on-line parts catalog 54. Designers 56, who typically have responsibility for intermediate levels of the product trade, propagate the constraints from the top and bottom of the tree towards each other. Each component (either automatically via computerized agents or under guidance from humans) buys and sells allocations (i.e., assignments) on its attributes to and from other components.

A product exists not only in design space (characterized by features such as weight, power, and shape), but also in manufacturing space (characterized by such features as process, raw material, and operator skill) and requirement space (characterized behavioral features such as speed, range, and survivability). For example, a customer of the product (e.g., a customer of a vehicle) can determine the incremental value of another five kilometers per hour of vehicle velocity, or another twenty-eight kilometers of range. Cost as defined by manufacturing flows up through design to the customer. For example, designers 56 (with input from manufacturing 57) determine the cost of providing an increment of velocity or range. The present invention supports these three spaces and provides mapping among them.

Manufacturing Scenario

Figure 2B:
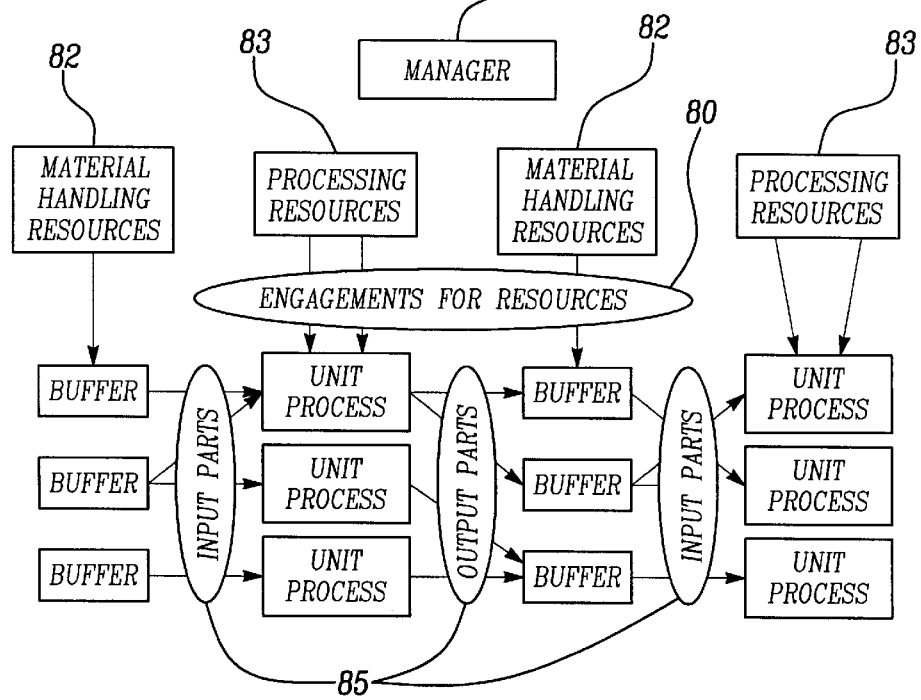
FIG. 2b is a flow diagram showing agents involved in an example of a manufacturing system.

FIG. 2b illustrates the present invention utilized in an exemplary manufacturing scenario. The ovals (e.g., engagements for resource agent 80) and rectangles (e.g., material handling resource agents 82) illustrate the main agent classes in an exemplary implementation of the present invention in a manufacturing scenario. Each material handling resource 82 (such as a truck or a forklift), each processing resource 83 (such as a machine tool or an operator), and each individual physical part 85 is a separate computerized agent. Scheduling and logistics within the framework of the present invention emerge from the interaction of local agents. The manager agent 84 is an example of a "watchdog" agent 84, who maintains a global view of the operation and raises signals to alert the other agents when something undetectable on the local level needs attention.

To be effective, manufacturers must make efficient use of their expensive machinery while satisfying the expectations of their customers and the physical requirements of the manufacturing process.

Typically, (manufacturing) variables are the times at which different manufacturing events happen. For example, some variables might be "the time machine xyz starts operation on part 123," "the time machine xyz finishes operation on part 123," and "the time machine abc starts operation on part 123." From these can be derived duration variables, such as "the length of time machine xyz is operating on part 123," which is the difference between the first two example variables.

The domains of all time variables are time values (for example, "3:24 PM, Monday, Mar. 24, 1997"). The domains of all duration variables are time interval values (for example, "3,897 seconds").

Constraints are imposed by the machines in the shop, the process plans that tell how to turn raw materials into products, the suppliers of raw materials, and the customers. The following list provides an example of each:

(1) Machine constraint: The machine is unavailable 10% of the time for maintenance. Thus the sum of durations of actual operations should not be more than 90% of the total time;

(2) Process constraint: Part 123 should visit machine abc before machine xyz. Thus "the time abc finishes operation on 123" should be earlier than "the time xyz begins operation on 123;"

(3) Supplier constraint: It takes three days to fill an order for the raw material for part 123. Thus the difference between "the time the order is placed for materials for part 123" and "the time the first machine starts work on 123" should be at least three days.

(4) Customer constraint: The part is promised for delivery at a particular time, and the manufacturer should pay a penalty for every day that the part is late. This is an example of a constraint that is not binary. The closer the delivery is to the promised time, the better, but a late delivery is possible.

To schedule the factory within the present invention, times are assigned to all the time variables (and thus durations to all the duration variables), subject to the constraints. The consequences of violating a constraint depend on the constraint. If a machine is deprived of needed maintenance, it may fail and keep the factory from manufacturing anything. If the process plan is not satisfied, the product will not meet specifications. If the customer is not satisfied, there will be no buyers for the goods of the factory. All of these criteria impact the factory's profitability, and the system's objective is to maximize that profitability. Thus the factory scheduling problem is a constraint optimization problem whose objective function is the profitability of the factory.

A manufactured product that consists of many parts (such as, a vehicle's suspension system) can only operate correctly if the various components interact appropriately with one another. These interactions are dominated by various design variables. For example, the design of the transmission in a car depends on the intended speed range of the vehicle and the range of RPM and torque that can be delivered by the engine, while the accessories and the electrical generating system must agree on the voltage and amount of electrical power required. These variables form the variables of a constraint optimization problem. Each variable typically has its own domain.

Each component in a design constrains the values of those design variables in which it is involved. A manual transmission constrains the relation between crankshaft and driveshaft torque and RPM, but has no "interest" in the voltage of the electrical system; the alternator cares about the crankshaft RPM and the voltage, but not about the driveshaft RPM, and so forth.

Lastly, it must be understood that the present invention is not limited to only a manufacturing scheduling or design, but includes such other applications as system control, route planning (e.g., material or computer network route planning), logistics management, organizational design, or generally where constraint satisfaction problems exist.

Structure and Method of the Present Invention

Product design or manufacturing planning and scheduling are exemplary of a constraint optimization problem in which the various components must agree on the shared variables in which they are interested, subject to the objective of producing a design or manufacturing process that will optimize the profitability of the overall system. The details of designing/manufacturing affect at least two aspects of this objective: the cost of designing/manufacturing and the price the customer will pay. For many applications, the best solution is the one that maximizes the amount by which the price the customer will pay exceeds the cost of designing/manufacturing.

The following structure is used by the present invention to achieve the aforementioned objective:

(1) a set of variables $X=\{X_1, X_2, \ldots, X_m\}$, each with a corresponding domain $D=\{(d_1, d_2, \ldots, d_m\}$. The variables may be of any type, including (but not restricted to) denumerable sets, integers, real numbers, and vectors. It is not necessary that the variables be numerical;

(2) a set of constraints $C=\{C_1, C_2, \ldots, C_n\}$, each one a function from some subset of the variables to a preference value. The preference value may be Boolean (indicating that the constraint either is or is not satisfied) or of higher cardinality. Given two assignments to the variables involved in a constraint, the one yielding the higher preference value is preferred to the one yielding the lower preference value. The functional dependency in a constraint need not be represented explicitly (either by closed analytic form, enumeration, or a software algorithm), but can be implicit in the expertise of a human decision-maker;

(3) a set of agents, each of which is either a computer program or a human decision-maker supported by computerized tools;

(4) one or more agents (called "customers") with an interest in the overall outcome of the constraint optimization problem, each owning (either explicitly or implicitly) a (possibly distinct) utility function over the possible values of some or all of the variables (note: this utility function does not depend on the utility that other agents in the system associate with variables in which the customer has an interest);

(5) one or more agents (called "suppliers") able to make assignments to some or all of the variables, and each owning (either explicitly or implicitly) a cost function over the possible assignments to the variables to which it can make assignments (this cost function does not depend on the costs that other agents in the system attach to variables on which the supplier may depend).

The following describes the steps involved in utilizing this structure. However, it should be understood that the present invention is not limited to the following order of steps since the order depends in part upon the information available for the task at hand. For example, some of the variables and constraints can be identified first, and only after the trading has begun are others known. Thus the steps may be concurrent.

First, within the preferred embodiment of the present invention, the variables and constraints are defined. These are typically defined by the problem domain. The present invention supports constraints that are defined implicitly, for example, by some entity in the problem domain (such as a component in a design problem, or a machine in a scheduling problem, or a process step in a process design problem). Each constraint is matched with the variables that it constrains, and each variable is matched with the constraints that constrain it.

Figure 3:
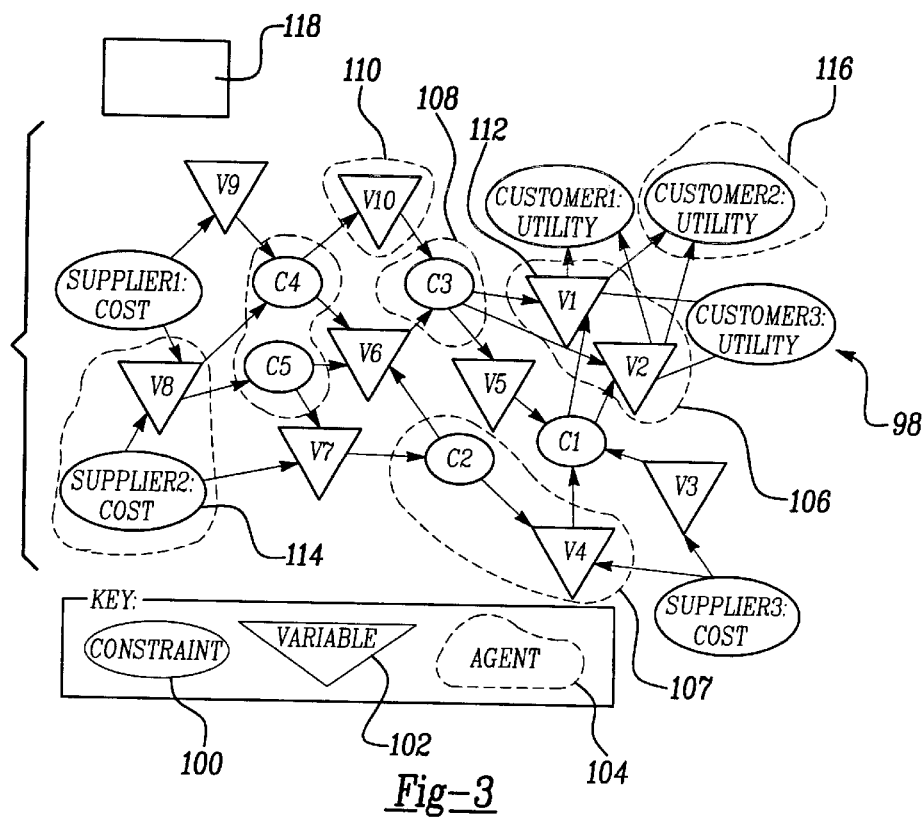
FIG. 3 is a constraint network diagram showing an exemplary set of interconnections among constraints and variables.

Referring to FIG. 3, the result of this step will be a constraint network 98 of constraints 100 and variables 102 (but without heads on the arrows). Within the field of the present invention, a constraint is "interested in" or "has an interest in" those variables that are adjacent to it in this network, and a constraint which is interested in a variable 102 is said to "participate" in it (i.e., in the market that it maintains).

In highly analytic domains, constraints 100 may be known in advance and can be written down. In many practical applications, constraints 100 are represented only implicitly, by the agents 104 that represent them, so that identifying constraints 100 becomes an issue of ideritifying agents. Variables 102 are then identified as the pieces of information on which the constraints 100 need to reach agreement. Links between constraints 100 and variables 102 may be defined in advance, or constraint agents may discover new variables as the system operates, broadcast them to other potentially interested constraint agents (in some cases, the entire design team), and then spawn new variable agents if more than a single constraint agent is interested.

The preferred approach to identifying constraints 100 is linguistic in nature by writing down a prose description of the problem to be solved, and examining the nouns in the description. The nouns usually identify the main entities that become agents 104, and many of these represent a constraint or a cluster of constraints.

To identify variables, each pair of entities is considered (for example, by constructing a matrix whose rows and columns carry the names of the entities, and then considering each cell in the upper half-matrix), and the following issue is addressed "what pieces of information do these two entities need to agree on in order for this system to function properly?"

Secondly, constraints 100 and variables 102 are assigned to agents 104. The basic mapping includes assigning a separate agent to each variable and each constraint. For reasons of implementation efficiency, it is sometimes desirable to assign multiple variables, or multiple constraints, or some mixture of variables and constraints, to a single agent (as shown, for example, by agent 106). The dashed lines in FIG. 3 delineate sample assignments of variables and constraints to agents. The agent to which a given constraint is assigned is called "the constraint agent" (for that constraint), while the agent to which a given variable is assigned is called "the variable agent" (for that variable). An example of a constraint agent is shown at reference numeral 108. An example of a variable agent is shown at reference numeral 110. Because mergers of variables and constraints into a single agent are allowed, in some cases the agent identified by the expression "the variable agent" may be the same as the one identified as "the constraint agent" (as shown, for example, by agent 107).

Thirdly, buyer and seller agents are identified. Since each constraint agent either buys or sells each variable that it constrains, each variable has at least one buyer and at least one seller, and each variable lies on at least one directed path of buyers and sellers extending from a supplier to a customer for the entire network. The arrows in FIG. 3 show an example of the sellers and buyers being identified -- that is, with the tail toward the seller and the head toward the buyer. For example, constraint agent 108 is a seller agent of variable "V1" 112 and is a buyer agent for variable "V10" 110.

Customer agents (e.g., customer agent 116) are the ultimate authorities on the utility of (some of) the variables, and so do not need to sell any variables; supplier agents (e.g., supplier agent 114) are the ultimate authorities on the costs of (some of) the variables, and so do not need to buy any variables. Customer agents must buy the variables for which they are customers, and supplier agents must sell the variables for which they are suppliers, but otherwise the roles of agents as buyers or sellers for particular variables are fairly fluid, subject to the following restrictions:

* there is at least one constraint agent identified as a potential buyer agent for each variable, and at least one constraint agent is identified as a potential seller for each variable; and
* each constraint agent is either a buyer or a seller for each variable that it constrains.

The buying and selling roles must be assigned in such a way that if those roles are used to draw arrows as illustrated in FIG. 3, every variable lies on a directed path leading from a supplier agent to a customer agent. This restriction ensures that each variable can be influenced both by the costs estimated by supplier agents and by the utilities estimated by customer agents. The dynamics of a market-based community of agents emerge from the interactions of the various agents, rather than being imposed top-down from a central location. This decentralized approach of the present invention offers several advantages in that it is typically more robust and adaptive than the centralized approaches of the current approaches.

Variable agents have "figures of merit" which variable agents can report to interested constraint agents. Using these figures of merit, the supporting software for a constraint agent displays to the human decision-maker via computer-human interface 118 a display of the variables of interest in a way that permits the human decision-maker to identify the most important variable to analyze next.

Figure 4:
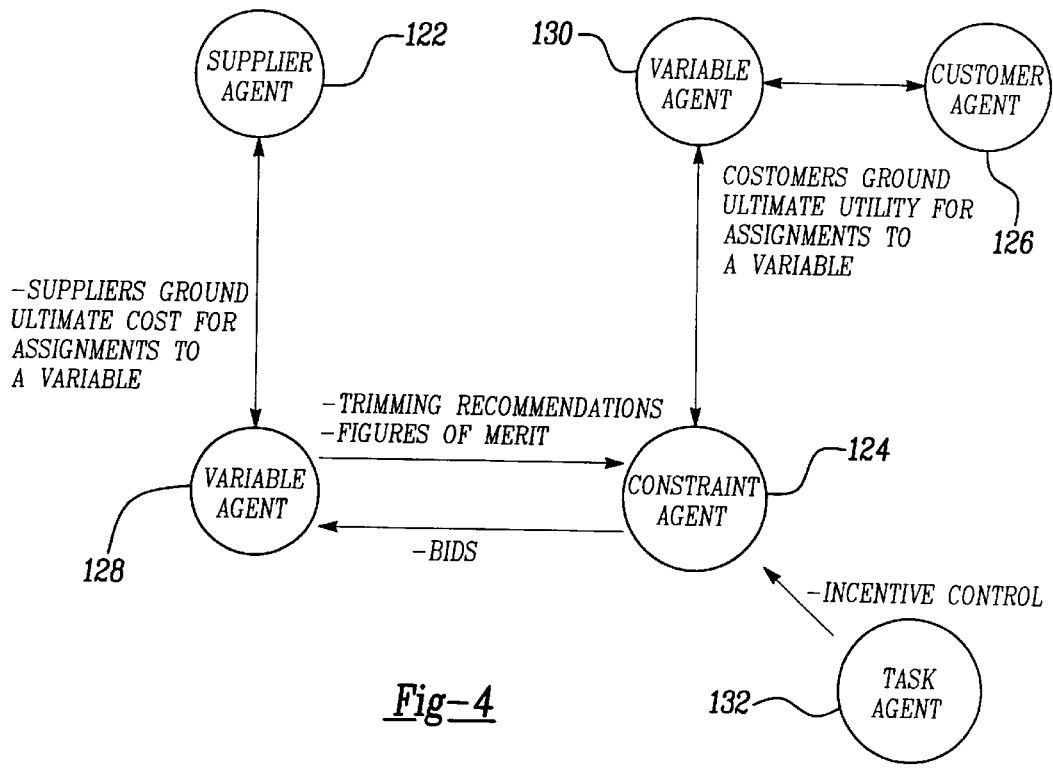
FIG. 4 is a data flow diagram showing the top-level flow of data among agents.

Fourthly, the constraint agents negotiate with one another over the assignments to the variables. FIG. 4 below outlines the mechanisms of the present invention which support this negotiation.

FIG. 4 depicts the preferred top-level negotiation data flows among the various agents of the present invention. Supplier agent 122, constraint agent 124, and customer agent 126 employ variable agents to assist in the negotiations for the buying and selling of variables. Since supplier agent 122 and customer agent 126 have similar data flows as constraint agent 124 does with respect to variable agents, the present discussion focuses upon the data flow between constraint agent 124 and variable agent 128. The similarity results from the present invention's preferred embodiment wherein supplier agents are constraint agents which ground the ultimate cost for a variable and customer agents are constraint agents which ground the ultimate utility for a variable.

Constraint agent 124 negotiates with other constraint agents over a variable with which variable agent 128 is involved. Constraint agent 124 communicates to variable agent 128 bids indicating the preferential sets in which constraint agent 124 wishes to buy/sell the variable. Variable agent 128 compares the bids with the bids of other constraint agents. Variable agent 128 sends to constraint agent 124 trimming recommendations based upon the aggregated bids. Moreover, variable agent 128 may compute various figures of merit in order to provide its recommendation in a way that permits constraint agent 124 to compare the state of problem-solving with respect to different variables and select the most important one to consider next. Additionally, task agent 132 sends grant and tax data signals to constraint agent 124 in order to provide an incentive control in the negotiation process.

Figure 5A:
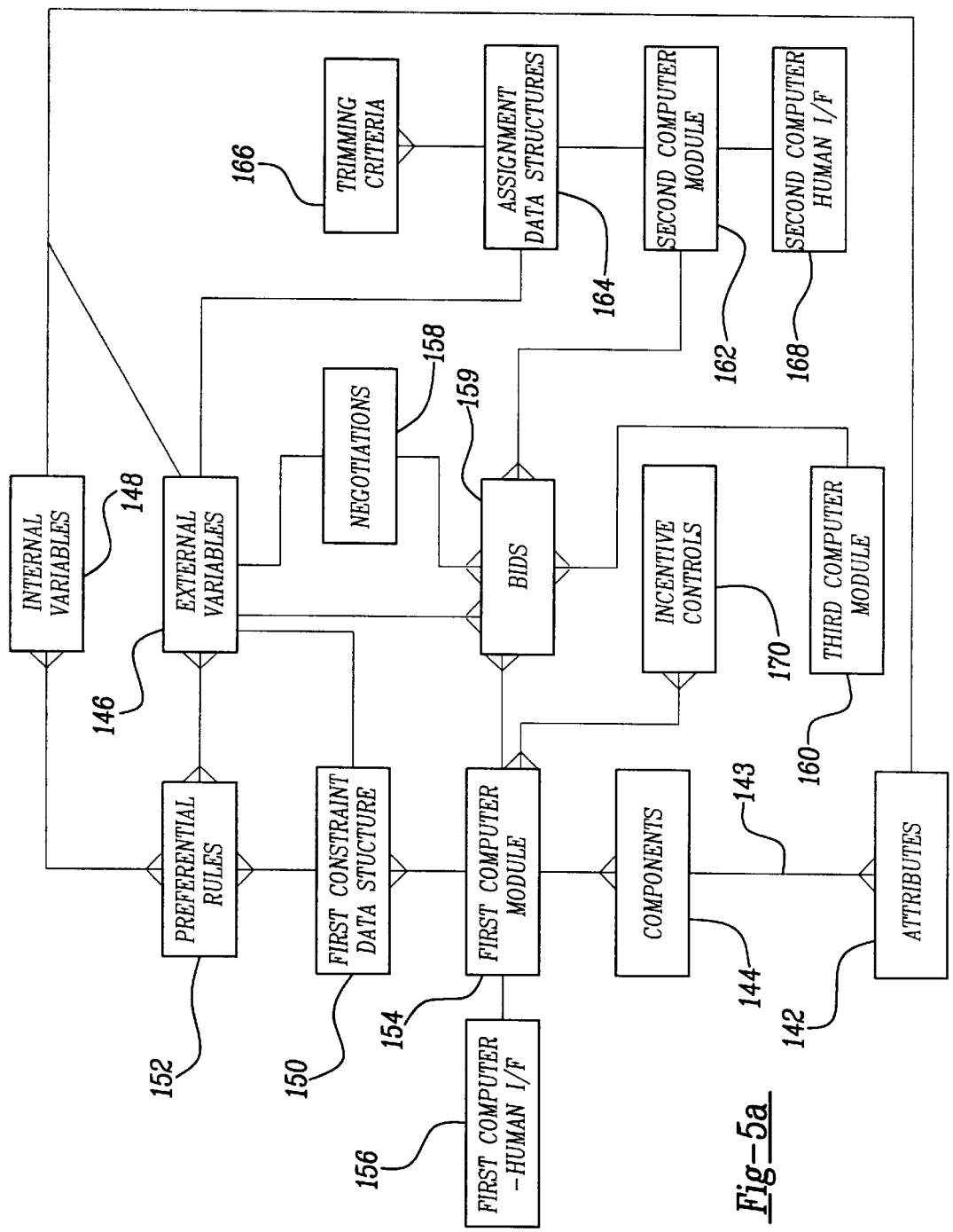

FIG. 5a generally illustrates relationships among the entities of the present invention for determining assignments to attributes 142 of components 144 within a system. Within the preferred embodiment, components 144 have a "one-to-many" relationship with respect to attributes 142 as depicted in FIG. 5a by the single-prong end and the three-prong end of relationship 143.

Variables (i.e., external variables 146 and internal variables 148) are used which are indicative of the assignments to the attributes 142. External variables 146 are the variables which computer modules negotiate over (i.e., market variables). Internal variables 148 are variables which are internal to the operation of a computer module. An example of an internal variable is the variable indicative of the displacement of an engine which is used within a power generation unit. Preferably, a single variable is used for a single attribute of a component.

The present invention uses a first constraint data structure 150 for determining a set of possible assignments for the variables in which a first computer module 154 is interested. The first constraint data structure 150 uses preferential rules 152 in order to make the determination of permissible sets of assignments. Preferential rules 152 may be based upon relationships to other external variables. However, it is to be understood that the present invention also includes where the preferential rules 152 are not based upon other external variables, but are based only upon internal variables. Moreover, it is to be understood that the term "rules" implies more than "IF-THEN" conditional-type rules and includes rules which indicate preferences by such techniques as curve shapes or Directed Acyclic Graphs (DAGs) or data representative of similar information in the curve shapes or in the DAGs. Additionally, the term "computer module" within the present invention includes, but is not limited to, modules or subroutines or agents or objects from such computer programming environments and languages as structured programming languages (e.g., FORTRAN or Pascal) or objected oriented programming languages (e.g., C++) or database programming languages (e.g., Microsoft Access) or agent-based technology (e.g., J++) or spreadsheets (e.g., Microsoft Excel).

The first preferential rules 152 include, but are not limited to, curve shapes which indicate how to optimize a predetermined criteria, such as utility, for first computer module 154. Curve shapes are discussed in greater detail below. Moreover, the first computer module 154 includes a first computer-human interface 156 for allowing human input to occur during negotiations 158. One or more bids 159 from computer modules are used in the negotiations 158 in order to determine assignments to the variables.

Negotiations 158 may include first computer module 154 entering into negotiations 158 over its interested variables with a third computer module 160. The preferred embodiment uses a second computer module 162 to act as a liaison between the first and third computer modules (154 and 160) in order to assist the negotiations 158 with respect to, a variable of interest.

The second computer module 162 uses an assignment data structure 164 to store data about external variable 146 aggregated from a plurality of bid 159. Second computer module 162 makes trimming recommendations to one or more computer modules based upon trimming criteria 166. The trimming criteria 166 help to optimize the utility of suggesting changes to assignments to a variable. Moreover, a second computer-human interface 168 can be used by the second computer module 162 in order to perform manual override if needed. Also, the present invention uses incentive controls 170 in order to provide taxes or grants to a computer module 154 depending on how quickly a computer module performs during negotiations 158.

Within the implementation of the preferred embodiment, a constraint agent uses the following entities of FIG. 5a: first computer module 154, first computer-human interface 156, first constraint data structure 150, preferential rules 152, and internal variables 148. Within the implementation of the preferred embodiment, a variable agent uses the following entities of FIG. 5a: second computer module 162, assignment data structures 164, trimming criteria 166, and external variables 146. Within the implementation of the preferred embodiment, a task agent uses the following entity of FIG. 5a: incentive controls 170.

Referring to FIG. 5b, a first constraint agent 191 determines assignments to a variable. In this example, second constraint agent 192 which requires the variable in its own operations determines the set of assignments to the prices that are acceptable for purchasing the variable. A variable agent 193 is used in the preferred embodiment to assist the negotiations between first constraint agent 191 and second constraint agent 192. First constraint agent 191 and variable agent 193 use sell bid curve shape 194 in order to communicate acceptable sell prices for the variable. Second constraint agent 192 and variable agent 193 use buy bid curve shape 195 in order to communicate acceptable buy prices for the variable.

Variable agent 193 preferably aggregates sell bid curve shape 194 and buy bid curve shape 195 into buy-sell aggregate curve 196. Buy-sell aggregate curve 196 indicates overlap regions where buy and sell conditions are potentially satisfactory to both first and second constraint agents (191 and 192) subject to their respective constraint data structures (not shown). Variable agent 193 also is capable of handling similar negotiations for the variable with other constraint agents (e.g., third and fourth constraint agents 190 and 198).

In this example, third constraint agents 190 is competing (or cooperating depending on the situation) with second constraint agent to acquire acceptable assignments of the variable. In this example, fourth constraint agent 198 is competing (or cooperating depending on the situation) with first constraint agent 191 to sell acceptable assignments to the variable. These negotiations are occurring approximately simultaneously with other transactions, such as the transaction between first constraint agent 191 and variable agent 199 over an assignment to another variable which first constraint agent 191 may wish to buy.

Figure 6A:
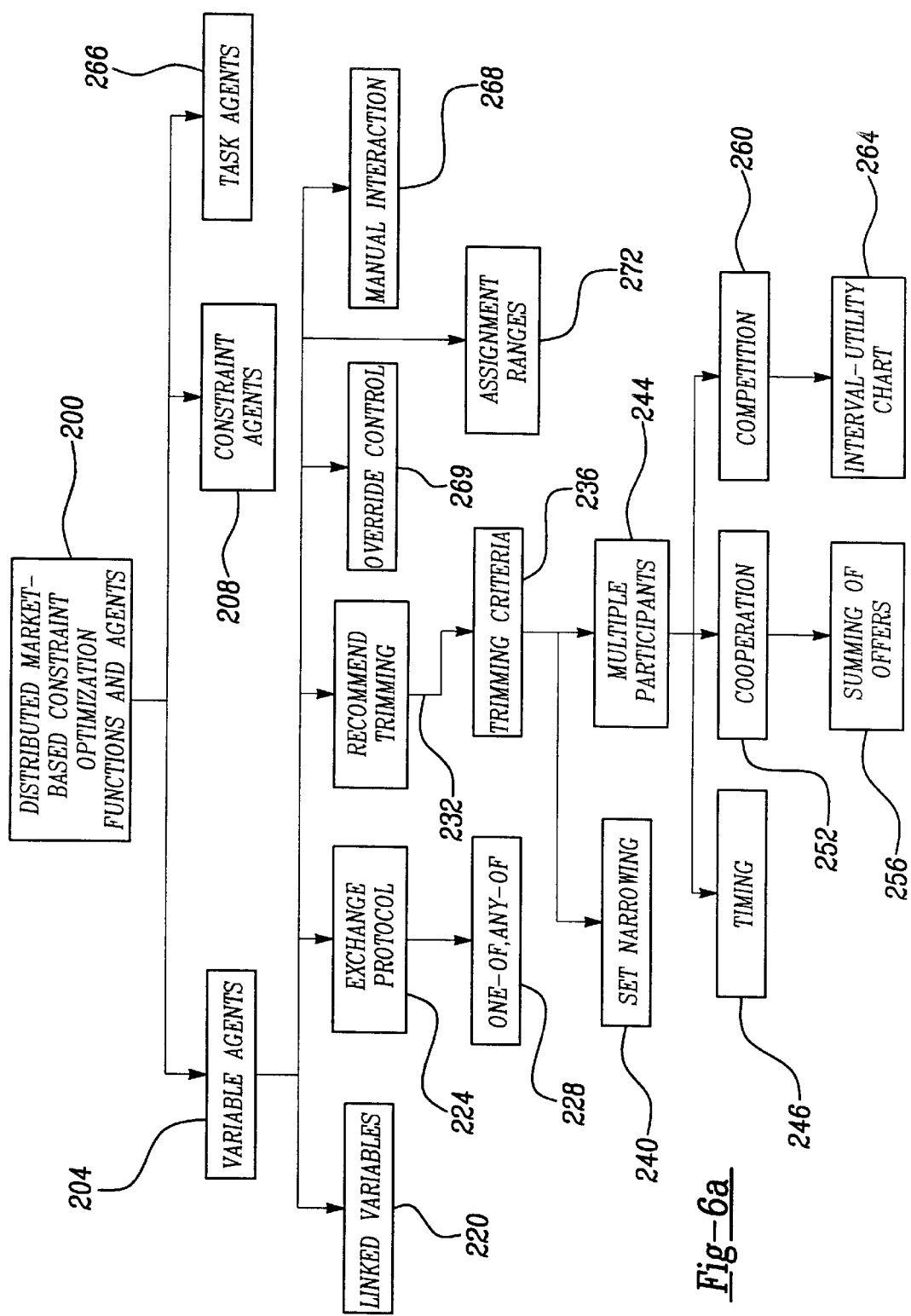

FIG. 6a is a structure chart of various agents used within the present invention and their operations. The preferred embodiment of the present invention uses the following types of agents: variable agents 204, constraint agents 208, and task agents 288. Supplier agents and customer agents are subclasses of constraint agents 208. The agents have the capability of communicating with one another through a computer network in order to more fully provide for distributed processing of the market-based constraint optimization network.

As shown by block 220, variable agents 204 have their variables linked so as to allow the assignments to a number of variables to be made together and to ensure that markets for any of them do not close. As illustrated at block 224, variable agents 204 follow an exchange protocol with other agents, such as the one preferred at block 228. Block 228 is a type of an exchange protocol which has two protocols. The first protocol is an "one-of" protocol and the second is an "any-of" protocol. An "one-of" exchange protocol indicates that the offer is valid only if a variable agent is allowed to select the final assignment. The "any-of" exchange protocol indicates that the offer from a variable agent is valid for any value in the range designated by the variable agent.

As indicated by block 232, variable agents 204 may use trimming criteria 236 to recommend to constraint agents 208 the subset of assignments which constraint agents 208 should trim from their set of assignments to maximize the difference of utility over cost and provide the variable agents 204 with information to guide them in selecting which variables are of higher importance (e.g., information on the marginal utility available from the variable).

As indicated at block 236, variable agents 204 use trimming criteria to estimate the direction and the amount of trimming for a particular assignment range that will maximize the difference of utility over cost. The trimming criteria preferably is based upon the curve shapes, assignment ranges, price ranges, one-of exchange protocol, any-of exchange protocol, or any combination thereof. Moreover, the trimming criteria of block 236 is utilized in block 240 which performs set narrowing and which is described in greater detail below.

The trimming criteria of variable agents 204 includes operations involving multiple participants as indicated at block 244. Block 244 indicates that a variable agent can aggregate bids from multiple sellers, and/or from multiple buyers, and can make a recommendation to the entire community of interested constraint agents. For a variable agent to operate with multiple participants, the variable agent uses the functionality of block 248 in order manage the timing of bidding among multiple participants. The timing functionality of block 248 includes mechanisms of fixed time intervals, fixed frequency of bids, rapidity of shrinkage of overlapping ranges (the last of which is discussed in greater detail below). Preferably, an initial deadline is established by which all interested participants should make their initial bids. Thereafter, updates are provided to all participants each time a new bid is received for a particular variable agent.

The case where multiple constraint agents are cooperating in their bidding, a variable agent combines the bids on each side of a transaction and on this basis recommends how all of the participants should adjust their assignment ranges as indicated at block 252. As indicated at block 256, a variable agent combines the bids of cooperating participants on each side of a transaction by summing their price functions (that is, cost for sellers and utility for buyers) over the interval of their overlap according to their curve shapes.

A variable agent also performs the functionality of block 260 wherein the variable agent compares the offerings of multiple constraint agents that are competing on one side of a transaction (e.g., sellers) and presents a summary and recommendation to the constraint agents on the other side (e.g., the buyers). As indicated at block 264, the variable agent summarizes the bids on the one side of a transaction (e.g., from sellers) in terms of a representation of their relative overlap with the other side of the transaction and the maximum possible gain of utility over cost that they offer to the other side.

A variable agent also monitors the overlap in assignment range among participating constraint agents, and if the overlap disappears, alerts them so they can resort to traditional mechanisms for developing the negotiations as indicated at block 268. Other situations when manual interaction is used is discussed in greater detail below.

Moreover, a variable agent preferably handles override control as indicated at block 269. If human decision-makers wish to maintain some of these variable assignments within certain limits, they can override any variable agent's decision that would push them out of range. A variable agent monitors any incoming bids to change its value, compares each indicated value with limits set by the human decision-makers, and accepts only those bids that conform with those limits. Such an agent provides its human decision-makers with an interface that permits them to define acceptable limits, to monitor the current state of the variable, and to change the variable's assignment directly.

Referring to FIG. 6b, constraint agents 208 each maintain links to the variables in which the constraint agents have an interest. Each constraint agent maintains its own preferred assignments to those variables and maintains its own estimates of marginal utility of those variables in the shape of dependency. Moreover, each constraint agent computes the interactions among the variables.

As indicated at block 272, a constraint agent maintains a set of assignments which a constraint agent is willing to make to each variable. Preferably, a constraint agent estimates its local preferences over their set of assignments for the variables in which it is interested, and not just for a single assignment.

A constraint agent uses the set narrowing functionality of block 240 with respect to its set of assignments. A constraint agent exchanges information about its preferences over their set of assignments. As a result of the communication, a constraint agent shrinks the set of assignments of each variable that is of value to it.

As indicated at block 280, a constraint agent can use problem mapping techniques wherein constraints are represented implicitly by the element of the problem (e.g., a part in a design, or a machine in the factory) that constrains associated variables, as well as by explicit mathematical formalism or tabulation. For example, a stamped metal part constrains the shape of a die used to stamp it, the operating parameters of the press in which it is manufactured, and the thickness of the metal from which it is manufactured, and the thickness of the metal from which it will be made, but the constraints among these variables are not known in explicit analytic form, and the assignments to the variables is often adjusted through iterations by human intervention to achieve the desired part.

Block 284 provides incentive control functionality for constraint agents 208 in the following manner. Taxes and grants to a constraint agent are integrated into the internal costs and utility functions of the constraint agent, and thus influence the decisions that the constraint agent makes. Taxes and grants can be flat (like a poll tax), a function of network, or a function of cash flow. They can also be independent of the constraint agent's choices, or defined over the variables in which the constraint agent has an interest, effectively modifying the shape of the external costs and utility functions that enter into the constraint agent's decisions.

To assist a constraint agent in the incentive control functionality of block 284, task agents 288 are utilized. A task agent taxes its constraint agents if the constraint agent is late in settling a particular task. Task agents 288 are described in greater detail below.

Constraint agents 208 are involved in the buying and selling of assignments to variables as indicated at block 292. Block 292 uses the set narrowing functionality of block 240 in its buying and selling operations. With respect to block 292, the agent for a constraint can stand in two relations to the variables with which it is interested: (1) it can cause an assignment to a variable (wherein the agent is said to "sell" the variable); or (2) its level of satisfaction may depend on some assignment to a variable that it cannot control falling in a specific range (wherein the agent is said to "buy" the variable). When the selling or buying process results in negative prices, the preferred embodiment reverses the direction of the sale to maintain positive prices.

As indicated at block 296, each constraint agent maintains a local figure of merit based upon the following costs and utilities: (1) its own internal costs of operations; (2) the net cost of purchasing appropriate assignments for variables for which it is a buyer; (3) its own internal utility of being able to make appropriate assignments to variables for which it is a seller; and (4) the utility it can realize by selling variables to other agents. Summarily, the figure of merit is the difference between the sum of its utilities and the sum of its costs. The functionality of block 296 utilizes block 300 wherein a constraint agent communicates its interests in buying and selling of variables by specifying price ranges which it finds acceptable. Price ranges are preferably used, rather than just point prices.

The means for computing prices within block 296 is performed by block 304. Block 304 computes the prices for which a constraint agent will sell and buy variables and supports a number of mathematical results relating the behavior of individual agents to that of the entire system, and helps to address the problem of "locally optimum, globally suboptimum." In other words, given internal costs "C" and internal utilities "U" (both functions over the variables in which the constraint agent is interested), the constraint agent sells so that the sum of its asking prices is the sum of what those selling to it ask plus the quantity "C-U." Moreover, the constraint agent buys so that the sum of its offers is a sum of what those buying from it offer plus the quantity "U-C."

As indicated by block 308, these utilities and costs are expressed in the same neutral currency by each constraint agent in the preferred embodiment. Moreover, as indicated at block 312, a constraint agent uses a local currency which is the actual currency in which the enterprise conducts its business. For example, if the system conducts its business in the United States, then the currency is preferably in United States dollars.

FIGS. 7a–12 describe in greater detail the negotiation operations performed by the agents of the present invention.

In the negotiation processes of the present invention, a constraint agent expresses its interest in a variable through a bid data structure which can include the following five data items:

(1) Whether it wants to buy or sell the variable;
(2) A set of assignments to the variable that it can accept;
(3) A set of prices that it would be willing to pay or accept for the variable over the set of assignments;
(4) Some indication of how price varies over the set of possible assignments;
(5) Whether its offer is good for "any of" the possible assignments to the variable (in which case another party may make the decision), or whether it is good only for "one of" the assignments (in which case this party reserves the right to make the decision).

Note that the term "set" is used since the present invention includes nominal variables as well as those variables whose values may be expressed in a range.

FIG. 7a depicts how data items #2 and #3 define a region of price/assignment space. Graph 350 has price as the ordinate axis and the range of assignments for a variable as the abscissa axis. The assignment range which a constraint agent finds acceptable (i.e., data item #2 in the above list) is shown at reference numeral 354. The price range which a constraint agent is willing to pay is shown at reference numeral 358. While graph 350 depicts orderable assignments, it is to be understood that the present invention is not limited to only orderable assignments, but includes assignments that are enumerated, such as color or type of material.

Constraint agents typically begin in "one-of" mode, and switch to "any-of" as soon as the assignment ranges have narrowed sufficiently that they can make a meaningful bid on "any-of" terms. Also, the decisions made by a constraint agent are often very complex, and it is frequently the case that these decisions are made by humans participating in the system.

Referring to FIG. 7b, graph 350 shows a designer's set-based bid for a variable. The set-based bid is a rectangle 362 of low and high values along each dimension of the Cartesian plane defined by assignment range 354 and price range 358. A set-based bid is where buyer agents and seller agents express value and quantity in terms of intervals of probability distributions rather than by points.

FIG. 7c depicts the result of combining the worst-case and best-case curves on a single supply and demand diagram. The solid lines 380 represent the worst-case bids. The dashed lines 381 represent the best-case bids. Rectangles (385 and 386) depict how these lines (380 and 381) are generated from the "rectangle" interpretation of a set-based bid. Supply and demand graphs are used in the present invention for those variables which can be meaningfully summed across the entire system, such as weight.

The four lines (380 and 381) describe a lozenge 387. The leftmost vertex of lozenge 387 shows where the market would clear under the most conservative assumptions. This vertex is the clearing point that is determined using the worst-case curves 380. Because it is a "worst-case" point, it is considered permissible to let the market actually close at this point, and trade off the indicated number of units. This action changes the constraints on some of the agents, and leads to a different situation in subsequent rounds.

The rightmost vertex of lozenge 387 shows the largest amount of units that could possibly clear, given the current estimates of the participants, and might be useful to estimate the range of units that is in the final design. The top and bottom vertices of lozenge 387 estimate maximum and minimum clearing prices, and summarize the likely prices that units might command in the design activity.

Table 1 shows the set of shape indicators that the present invention uses to express the qualitative relation between price and assignment (i.e., data item #4 in the list above).

TABLE 1

| Price/Assignment Shape Indicators | |
|---|---|
| / | Price increases with assignment |
| \ | Price decreases as assignment increases |
| ʌ | Price is maximum somewhere in the middle of the range |
| v | Price is minimum somewhere in the middle |
| - | Price is relatively flat over the range |
| ~ | Price varies in an unspecified fashion over the range |

Based upon these bid shapes, an example of buy bid data in the preferred bid data structure is the following: ($0–$700); (30–65); "ʌ"; "any-of". The first portion of the exemplary buy bid data indicates the set of prices that it would be willing to pay for a set of assignments to the variable (that set of assignments being provided in the second portion of the buy bid data). The third portion provides some indication of how price varies over the set of possible assignments. The fourth portion indicates that its offer is good for "any of" the possible assignments to the variable.

Alternate embodiments of the present invention include different methods of representing curve shapes, for example, by providing the constraint agent a line with a number of moveable handles on it that can be adjusted into various shapes; or by providing the constraint agent two lines with handles in order to permit the region of uncertainty between them to be represented; or by permitting the constraint agent to "airbrush" a curve shape over the price/assignment region.

For the sake of clarity, the discussion examined variables for which the potential assignments can be ordered -- that is, any potential assignment is either less than, greater than, or equal to any other potential assignment. This class of variables includes those whose assignments consist of integer or real numbers, such as weight, torque, time, or probability of occurrence. The scope of this invention is not limited to such variables, but also includes variables (called "nominal variables") whose potential assignments do not have a natural ordering. An example of such a variable is the material out of which a product should be made, or the color it should be painted.

A constraint agent interested in buying an assignment to a nominal variable will often prefer one assignment to another, and so will be willing to pay more for one assignment than for another. A constraint agent interested in selling such an assignment may similarly charge more for one than for another. However, because the potential assignments do not have a natural ordering, there is no guarantee that the sequence of the buyer's preferences will be the same as the order of the seller's preferences. For example, the buyer may prefer materials in the order <wood, plastic, aluminum, steel, ceramic>, ranging in buy price from $500 to $300, while the seller may prefer materials in the order <plastic, ceramic, steel, aluminum, wood>, ranging in selling price from $250 to $800. Each constraint agent could draw a price curve by ordering the X-axis in its preferred sequence, but because the price curve shows only the general shape of the price function and not its actual values at each point, the variable agent cannot aggregate these prices on a single plot with a common X-axis and recommend trimming.

A number of formalisms permit the techniques of this invention to be applied to such variables. The preferred embodiment requires each constraint agent to generate a directed acyclic graph (DAG) that reflects its preferences, and to specify the prices it assigns to each end of the partial order thus defined. Each edge in the DAG originates at the alternative with lower price and terminates at the alternative with higher price. The use of a DAG means that the constraint agent need not establish a preference between every possible pair of possible assignments, but can begin by specifying only those preferences that it clearly knows initially. The DAG for a constraint agent need not be connected. This DAG is called a "price DAG." The price DAG for the seller is the sell DAG, and the price curve for the buyer is the buy DAG.

FIG. 7d shows the preferred human interface for the buy DAG 393. In this example, the constraint agent (a buyer) has the highest utility for Wood 388 (not more than $500) and the lowest for Ceramic 389 (not less than $300). It prefers Wood 388 to either of Aluminum 390 or Steel 391, and both Aluminum 390 and Steel 391 to Ceramic 389, but is indifferent to Aluminum 390 with respect to Steel 391. It also has no preference between Plastic 392 and any of the other materials, indicated by the lack of any arrow connecting Plastic 392 with the rest of DAG 393.

FIG. 7e shows a sell DAG 394 for an exemplary constraint agent offering material for sale.

Computationally, price DAGs are preferentially represented as adjacency matrices. The rows and columns of the matrix represent the alternative assignments to the variable in an arbitrary but fixed order (preferentially, the alphabetic order of the names by which they are called; in this case, <Aluminum, Ceramic, Plastic, Steel, Wood>). For each pair of alternatives in a price DAG such that the first has a higher price than the second (as indicated in FIG. 7d by an arrow with the head at the first member of the pair and the tail at the second), the cell in the matrix whose row corresponds to the higher-priced alternative and whose column corresponds to the lower-priced alternative has a '1'. All other cells in the matrix are '0'. Table 2 shows the adjacency matrix for the buy. DAG (393 in FIG. 7d), and Table 3 shows the adjacency matrix for the sell DAG (394 of FIG. 7e).

TABLE 2

|          | Aluminum | Ceramic | Plastic | Steel | Wood |
|----------|----------|---------|---------|-------|------|
| Aluminum | 0        | 1       | 0       | 0     | 0    |
| Ceramic  | 0        | 0       | 0       | 0     | 0    |
| Plastic  | 1        | 0       | 0       | 0     | 0    |
| Steel    | 0        | 1       | 0       | 0     | 0    |
| Wood     | 0        | 0       | 1       | 1     | 0    |

TABLE 3

|          | Aluminum | Ceramic | Plastic | Steel | Wood |
|----------|----------|---------|---------|-------|------|
| Aluminum | 0        | 0       | 0       | 0     | 1    |
| Ceramic  | 0        | 0       | 0       | 0     | 1    |
| Plastic  | 0        | 1       | 0       | 1     | 0    |
| Steel    | 1        | 0       | 0       | 0     | 0    |
| Wood     | 0        | 0       | 0       | 0     | 0    |

The variable agent for a nominal variable uses the price DAGs to perform the same functions supported by price curves for ordered Variables.

Computing Prices

A variable agent computes prices according to the following method.

Let $B_{i,o}$ be the sum of the prices of offers to buy made by the ith agent (the "o" standing for "offer"). Let $B_{i,r}$ be the sum of the prices of the "received" bids to sell to agent i, that is, the total amount that agent i would pay if it bought at the prices offered to it.

Similarly, let $S_{i,o}$ be the sum of the prices of agent i's offers to sell, and $S_{i,r}$ be the sum of the prices offered to agent i by its customers. Further, let $C_i$ be the internal costs experienced by agent i, and $U_i$, its internal utility, so that its net internal cost is "$C_i-U_i$." In general, these variables are functions over the set of variables in which the agent has an interest. In addition, these functions are evaluated at the point when the agents' ranges on variables have collapsed.

Accordingly, the agents operate based upon the following rules:

Rule 1: $Bo_{i,o} \; S_{i,r}-C_i+U_i$

Rule 2: $S_{i,o} \; B_{i,r}+C_i-U_i$

That is, in formulating buy bids, each agent passes on as much as it can of the money it receives and still break even, based on the buy bids it is offered; in formulating sell bids, it sells for the lowest price it can and still break even, based on the sell bids it is offered.

To assist in this type of bidding, a variable agent maintains markets in the assignments to variables. Variable agents perform one or more of the following functions (as were outlined in FIGS. 5b, 6a, and 6b): enforce protocol; recommend trimming; contribute to constraint agent's decision prioritization; link with other variables; integrate multiple buys or sells; and recommend manual interaction.

Enforce Protocol

The present invention implements the exchange protocol functionality of block 224 (FIG. 6a) and the "one-of, any-of" functionality of block 228 (FIG. 6a) in the following manner. A constraint agent classifies each bid as either "one-of" or "any-of," depending on how it interacts with other decisions in which it is involved. "One-of" means that the offer is good only if the constraint agent gets to pick the assignment within the set of assignments it has given. The set of assignments reflects the constraint agent's uncertainty about exactly which assignment it wants and the price range and shape curve are the constraint agent's best estimate of the prices over that set of assignments; but the ultimate assignment to a variable typically constrains other decisions that a constraint agent has to make, and so for the time being it reserves the right to select the final value.

"Any-of" indicates that the offer is good for any assignment in the set of assignments offered by the constraint agent. The price at which the constraint agent is willing to deal depends on exactly which assignment the constraint agent's trading "partner" decides to choose, but the constraint agent can handle any assignment in that range. An "any-of" bidder can accept a more drastic change in its bid range than can a "one-of" bidder, and the variable agent can use its knowledge of each bidder's status to guide the dialog.

In the course of a series of bids, if a constraint agent holds a "one-of" bid, the constraint agent can bid anywhere within the union of the constraint agent's last assignment region and its partner's. When the constraint agent is satisfied that the remaining variation won't compromise its decision any further, the constraint agent can move to "any-of," and task agents reward this shift tangibly, since it reduces the constraints faced by the rest of the system. In particular, the preferred embodiment provides a bonus for the first constraint agent to move to "any-of."

The holder of "any-of" bids remains within the intersection of its last assignment region and its partner's, and does not return to "one-of."

The variable agent recommends more aggressive shrinkage of intervals when the participants are all "any-of" than when some are "one-of."

When all of the buyers or sellers of an assignment to a variable are "any-of", then the market for that variable is one step from closing. All that remains is for the other participant (s) holding the "one-of" bids to select their preferred assignment and associated price and make their final bid. This may still require more than one negotiation cycle. The variable agent recognizes a final bid since the set of assignments is reduced to a single value.

Recommend Trimming

The present invention implements the "recommend trimming" functionality of block 232 (FIG. 6a) in the following manner. Knowing the assignment ranges, price ranges, and shapes of the bids submitted by interested constraint agents permits the variable agent to recommend how those agents should trim their assignment ranges, thus narrowing in on an assignment that is maximally beneficial to all of them.

The recommend trimming operations include the following:

(1) Compute the intersection of the assignment ranges from the participants. If there is no intersection, recommend manual interaction.

(2) Assign models (e.g., linear models) to the shape information and taking into account the price ranges, identify the region of intersection in which buyer's price exceeds seller's price. If there is no such region, recommend manual interaction.

(3) Identify the end from which participants should trim their assignment ranges to move toward that portion of the region of intersection where the difference between buying and selling price is maximum. If no area offers significantly greater difference than another, or if there are multiple discontinuous areas, recommend manual interaction. If both shapes are monotonic over the region, compute the slope of each line (PriceRange/Assignment Range), then the difference between these slopes (BuySlope - SellSlope), and move to the right if this is positive, to the left if it is negative.

(4) Recommend more aggressive trimming if the range of price differences is great over the region and if both participants are "any-of," and lesser trimming otherwise.

The following are the linear models used in the preferred embodiment for step 2 above for "assigning models to the shape information." Let CBmax, CBmin, CBmid, and CBrange be the maximum, minimum, midpoint, and range of the variable in question from the buyer's perspective, with similar CS variables (e.g., CSmax, etc.) for the seller; MBmax, MBmin, MBmid, and MBrange the max, min, midpoint, and range of marginal price for the buyer (and similarly for the seller). Cmax, Cmin, Crange, Mmax, and Mmin leave the participant unspecified, but they apply to either. Beyond the range, the function is zero.

/: $F(x) = Mmin + Mrange^*(x-Cmin)/Crange$

\: $F(x) = Mmin + Mrange^*(Cmax-x)/Crange$

-: $F(x) = Mmid/2$ (ideally, Mrange should be 0)

∧: $F(x) = Mmin + Mrange^*(1-2^*|x-Cmid|/Crange)$ v: $F(x) = Mmin + Mrange^*(2^*|x-Cmid|/Crange)$ where:

"C" represents values of variable (i.e., the abscissa axis);

"M" represents marginal price (i.e., the ordinate axis);

"B" signifies buyer; and

"S" signifies seller.

FIGS. 8a and 8b illustrate the use of these linear models within the context of the present invention.

FIG. 8a illustrates a region of overlap (the length 400 of line 404), the region of positive "buy minus sell" difference (i.e., area 408), and the direction of recommended movement (i.e., the arrow head 412 on line 404). Buy function 416 is a "/" curve shape; and sell function 420 is a "∧" curve shape.

FIG. 8b illustrates a situation where a single trim recommendation can typically not be made since the regions where the buy price is greater than the sell price are disjoint; accordingly no single direction of movement can be recommended.

A variable agent for a nominal variable uses the DAGs from negotiating agents, rather than price shape curves, to recommend which possible assignments may be excluded from further consideration. In the preferred embodiment, it does this by the following steps.

(1) Each adjacency matrix is multiplied by itself until two successive results are the same. The resulting matrix is the dominance matrix, showing which possible assignments dominate which other ones either directly or indirectly. For example, the result of repeatedly multiplying Table 2 by itself is given in Table 4. Table 4 differs from Table 2 in the addition of a '1' in the cell with row Wood and column Ceramic. Because Wood has higher utility to this agent than does either Aluminum or Steel, and because both Aluminum and Steel have higher utility than does Ceramic, Wood also has higher utility than does Ceramic.

TABLE 4

|  | Aluminum | Ceramic | Plastic | Steel | Wood |
| --- | --- | --- | --- | --- | --- |
| Aluminum | 0 | 1 | 0 | 0 | 0 |
| Ceramic | 0 | 0 | 0 | 0 | 0 |
| Plastic | 1 | 1 | 0 | 0 | 0 |
| Steel | 0 | 1 | 0 | 0 | 0 |
| Wood | 1 | 1 | 1 | 1 | 0 |

(2) The transpose of the dominance matrix is performed for the sell DAG -- that is, the rows and columns are reversed. Table 5 shows the dominance matrix for Table 3, and Table 6 shows the result of transposing it. This transposition has the effect of inverting the sell DAG, putting low prices at the top and high prices at the bottom. After this inversion, if two alternatives are in the same order in the sell and buy DAG's, the one with higher utility also has lower cost than the other, and is thus clearly preferred to the alternative.

TABLE 5

|  | Aluminum | Ceramic | Plastic | Steel | Wood |
| --- | --- | --- | --- | --- | --- |
| Aluminum | 0 | 0 | 0 | 0 | 1 |
| Ceramic | 0 | 0 | 0 | 0 | 1 |
| Plastic | 1 | 1 | 0 | 1 | 1 |

TABLE 5-continued

|  | Aluminum | Ceramic | Plastic | Steel | Wood |
|---|---|---|---|---|---|
| Steel | 1 | 0 | 0 | 0 | 1 |
| Wood | 0 | 0 | 0 | 0 | 0 |

(3) A cell-by-cell logical AND of the buy dominance matrix and the transposed sell dominance matrix is performed. The cells that remain non-zero identify orderings that are true of both buyer and seller, and from them a joint DAG can be constructed reflecting the excess of utility over cost. The variable agent recommends trimming from the bottom of this DAG.

TABLE 6

|  | Aluminum | Ceramic | Plastic | Steel | Wood |
|---|---|---|---|---|---|
| Aluminum | 0 | 0 | 1 | 1 | 0 |
| Ceramic | 0 | 0 | 1 | 0 | 0 |
| Plastic | 0 | 0 | 0 | 0 | 0 |
| Steel | 0 | 0 | 1 | 0 | 0 |
| Wood | 1 | 1 | 1 | 1 | 0 |

Figure 9:
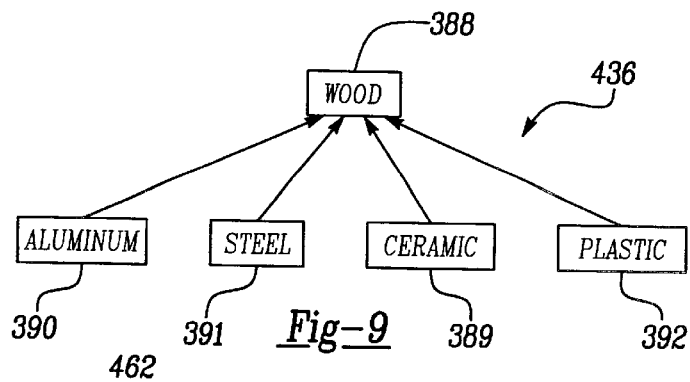
FIG. 9 is a Directed Acyclic Graph illustrating the use of nominal variables within the present invention.

In the example, the result is DAG 436 depicted in FIG. 9, in which wood 388 is preferred to each of aluminum 390, steel 391, plastic 392, and ceramics 389, but no preference can be deduced among these latter four.

Contribute to Constraint Agent Decision Prioritization

At any moment in the process, a given constraint agent is considering a number of different variables and their impact on the satisfaction of the constraint. Human decision-makers supporting a constraint agent (and typically many algorithms as well) perform well when they can "think" about one variable at a time. The variable agent can compute various "figures of merit" for providing its recommendation in a way that permits the constraint agent to compare the state of problem-solving with respect to the different variables and select the most important one to consider next.

Figures of merit of the present invention for a variable include:
* The maximum difference of buy price over sell price (e.g., the maximum height of the area 408 in FIG. 8*a*);
* The range of the differences of buy price over sell price (e.g., the difference between the maximum and minimum heights of area 408 in FIG. 8*a*);
* The size of the trim that the variable agent is recommending;
* The level of monotonicity of the price curves (highest if both participants offer monotonic curves, lowest if both have a "~" curve shape); and
* The size of the last change in the assignment range.

Link With Other Variables

The present invention implements the "linked variables" functionality of block 220 (FIG. 6*a*) in the following manner. A group of variables may need to be traded together. For example, in a design situation, the torque and RPM of a shaft should both be purchased from the same source --i.e., from the supplier of the (single) shaft. The associated variable agents can be grouped together to help the constraint agents deal with them as a unit.

When multiple variables are selected together, they are represented by a single variable agent that presents its constraint agents not only with information on the individual variables, but also on the composite. The composite has its own price range; and the price range on each individual variable reflects only the incremental cost or utility associated with further changes in the assignment range of that variable.

Integrate Multiple Buys Or Sells

The present invention implements the "multiple participants" functionality of block 244 (FIG. 6*a*) in the following manner. There are at least three ways to classify variable markets with multiple participants. The first is whether the multiplicity is on the side of the buyers, the sellers, or both. The second is whether the multiple participants are competing with one another for a role in the final solution, or whether they will all be in the final solution and thus should cooperate to identify an assignment to the variable that suits all of them. The third is whether the variable in question is additive or not. Since the buy/sell distinction has already been discussed above, discussion turns to additive variables.

Additive variables are those variables whose assignment is added up from the contributions of multiple sellers or from the demands of multiple buyers. For example, the weight of a product is the sum of the weights of its components; and the power consumed by a system is the sum of the power consumptions of each of its subsystems. Nonadditive variables are those that cannot be summed in this way, such as RPM or torque on a shaft, or the volume required to house a system, or its vibrational behavior.

Typically, competitive situations deal with multiple sellers and cooperative situations with multiple buyers, but exceptions can exist. An example of competition among buyers includes: a vertically integrated computer company which produces a line of machines, and supplies the chips from its own fab, which has limitations on the number of chips of each type that it can produce. Thus the product designs (i.e., the customers) must compete for scarce supplies; the task is to allocate these across the designs in such a way that all the products can meet their performance objectives.

An example of cooperation among sellers includes: several different power sources must agree on the voltage they are putting on the line to the load.

The objective in competitive trading is to pair up buyers with sellers in such a way as to maximize the net utility across the set of traders. When all the competition is on one side or the other (the most common scenario), the constraint agent is presented with the alternatives and invited to choose among them. With multiple competitive participants on both sides, the variable agent makes recommendations for pairing.

In cooperative situations, the various sellers are all present in the final solution, as are the various buyers. The final value of the variable under consideration balances the requirements of the entire group. In cooperative situations, the difference between additive and non-additive variables becomes of interest. Variable agents representing additive variables can use a supply and demand diagram to set prices, as described above.

Alternatively, variable agents representing either additive or non-additive variables can estimate an aggregate selling curve and an aggregate buying curve, and then proceed as though there were one seller and one buyer.

Besides managing a supply-and-demand diagram or aggregating price curves, variable agents support multiple buyers and sellers by managing the pace of the interaction. With one buyer and one seller, the transaction can be paced by the participants themselves. Initial bids can happen whenever the participants like, but subsequent bids usually alternate. Participants are permitted to modify bids before their trading partner responds, but enforcing exchange protocol rules (such as those outlined above in block 224 of FIG. 6a) is performed on the basis of an alternating series of bids. When there are several participants on one side or the other of a bid, coordination operations are preferably placed in the variable agent.

With respect to multiple competition, the variable agent estimates two figures of merit for each possible pairing of buyer and seller, from among those discussed above. It then presents each participant with a graph of the participants on the other side of the deal along these two axes. For example, if a seller sees many buyers clustered together in the desirable section of the plot, it can choose to keep negotiations open with all of them. If only one or two stand out, it can narrow its attention to those.

With respect to aggregating cooperative bids, the price curves are summed on each side of the transaction to form an aggregate of all sellers and an aggregate of all buyers, then the techniques developed above (e.g., as described for block 232 of FIG. 6a) are used to estimate how to trim the interval. Participants who have high margins influence the shape of the aggregate curve more than do participants with low margins, so the aggregate curve reflects in a well-defined way the aggregate demand of the variable in question.

Figure 10:
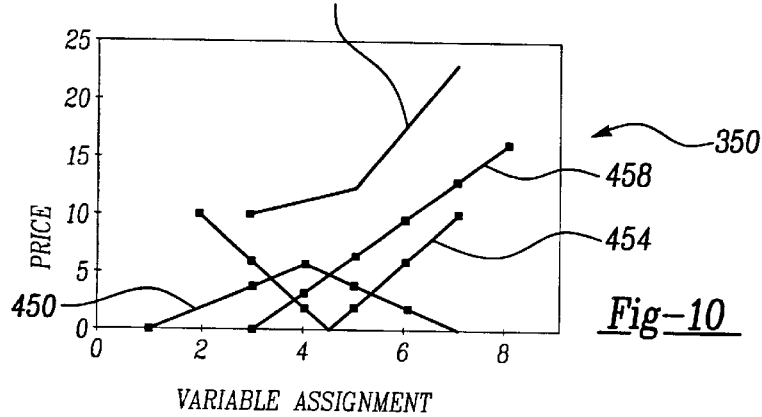
FIG. 10 is an x-y graph illustrating an exemplary inter-relationship between price and variable assignment for an aggregate buy curve.

For example, FIG. 10 shows how three buy price curves (450, 454, and 458) with different assignment ranges, margins, and shapes sum into a single more complex aggregate buy curve 462 over their region of intersection. FIG. 10 illustrates that the higher margin of the "/" buyer (i.e., buy price curve 458), and the trimming of the left-hand side of the "v" buyer (i.e., buy price curve 454), lead to an overall increasing shape of aggregate buy curve 462, though with a change in estimated slope in the middle of aggregate buy curve 462. The "voice" of the "^" buyer (i.e., buy price curve 450), while "softer" (because of the lower margin) is still heard; without buy price curve 450 the left end of the aggregate buy curve 462 would be much lower.

Figure 11:
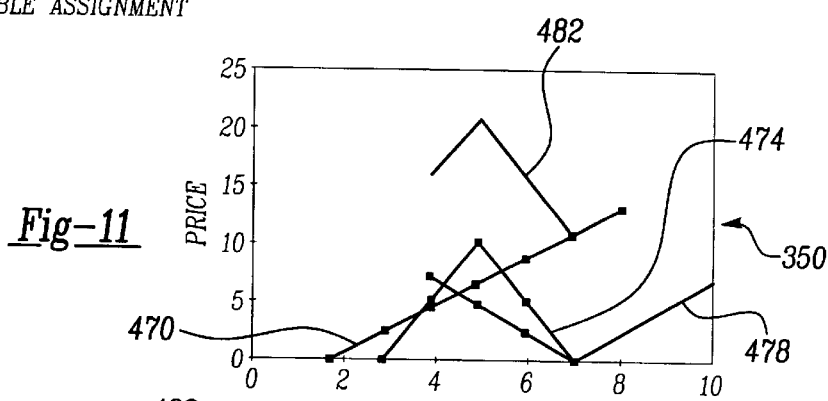
FIG. 11 is an x-y graph illustrating an exemplary inter-relationship between price and variable assignment for an aggregate sell curve.

FIG. 11 provides a similar aggregate picture for sellers' prices. Three sell curves (470, 474, and 478) are summed into aggregate sell curve 482. The relatively high margin and steep slope of the "^" sell curve 474 dominate the result, but the interests of the other participants (i.e., sell curves 470 and 478) are also reflected in the shape and magnitude of aggregate sell curve 482.

Figure 12:
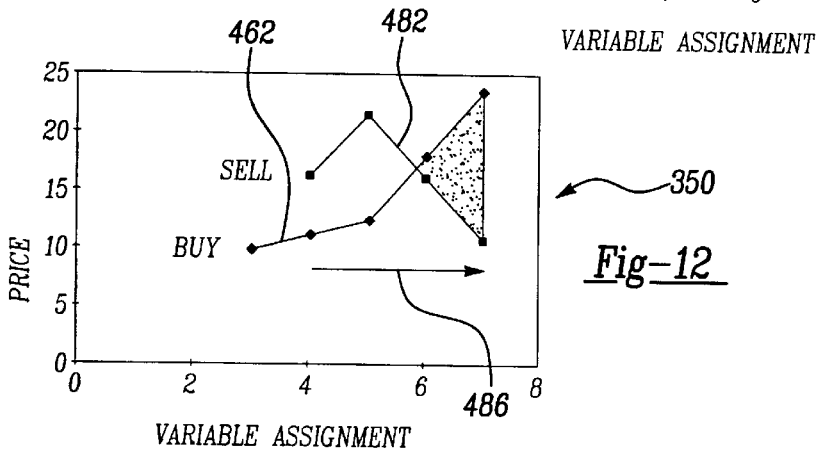
FIG. 12 is an x-y graph illustrating an exemplary inter-relationship between price and variable assignment for an aggregate buy and sell curve.

FIG. 12 shows the interaction of the two aggregate curves (i.e., aggregate buy curve 462 and aggregate sell curve 482) to produce a recommendation that all the participants narrow their intervals from the bottom end as indicated by direction arrow 486.

When the regions of intersection become very small within cooperative markets with multiple participants (as indeed in binary markets), the variable agent issues communications to the participants in order to have the participants seek traditional mechanisms to sort things out. Such traditional mechanisms include, but are not limited to, using humans interacting with other humans in order to resolve negotiation issues.

With respect to pacing multiple cooperative bids, information from multiple bidders are aggregated in order to complete a cycle of the negotiations. An external clocking function determines when to process the bids in hand and proceed to the next round. Alternate embodiments of the present invention for performing this functionality include:

* Operating on a fixed clock cycle (e.g., every half hour).
* Adjusting the speed based on the frequency of bid arrivals (e.g., iterate as soon as "N" number of bids have arrived).
* Adjusting the speed based on how rapidly the interval is converging. Rapid convergence (big steps) indicates that participants are closing in and should be able to provide new bids faster. Small steps signify they are processing more data, and so they should be given a longer time.
* Posting an initial deadline by which all constraints who wish to participate in the market must submit initial bids. Subsequently, updating the market each time a new bid appears, thus revising this variable's location on the prioritized display of variables seen by each participating constraint agent.

It is within the scope of the present invention to simplify multiple markets so that the multiplicity is only on one side or the other. In this case, the network is configured with an additional constraint that buys assignments to a variable from multiple sellers and then sells assignments of that variable to multiple sellers. When this constraint is automated, it is typically bundled into a single agent.

Recommend Manual Interaction

The present invention implements the "manual interaction" functionality of block 268 (FIG. 6a) in the following manner. In some problem areas, such as design, much of the work of constraint agents is done by human decision-makers. There will be occasions when the variable agents' heuristics and algorithms cannot make progress in the negotiations process. In these cases, the variable agents recommend that the constraint agents interact through traditional mechanisms to resolve the stalemate.

Situations in which a variable agent can recommend that its participating constraint agents interact with entities (e.g., humans) outside of its environment include: non-overlap of regions; incompatible prices; ambiguous curve shapes; and even differences.

With respect to non-overlap of regions, if the negotiation partners have non-overlapping intervals with both "one-of," the variable agent recognizes this condition and moves them to traditional mechanisms.

With respect to incompatible prices, the buy prices offered by buyers may be less than the sell prices offered by sellers over the overlapping range of assignments. If there are multiple competing buyers or sellers, this information is used to focus the constraint agent's attention on feasible partners for further automated interaction. However, if there is only one buyer and one seller, human control is used.

Ambiguous curve shapes (i.e., shapes that are not monotonic over the price/assignment regions of participating constraint agents) do not support strong negotiation recommendations by a variable agent. A buy shape of "^" and a sell shape of "v" over concurrent ranges do permit a recommendation to trim toward the center, and in some cases partial overlap of assignment ranges may trim away areas of inconsistency, but in other cases the variable agent asks the constraint agents to refine their own estimates further before it makes trim recommendations.

With respect to even differences, the range of differences between selling and buying prices may be roughly constant over the intersection of assignment ranges, so that the variable agent cannot suggest which direction the participants should trim.

Variable agents for nominal variables use price DAG's instead of price curves to identify a non-overlap condition and recommend manual interaction. In the preferred embodiment, three separate tests are applied to identify lack of overlap and provide information to the constraint agents that may help them close the gap:

(Test 1) The price ranges specified by the constraint agents may not overlap;

(Test 2) The constraint agents may have opposing preferences for different alternatives. For example, the buying agent may assign a higher utility to wood than to plastic, while the selling agent assigns a higher cost to wood than to plastic. Thus the high utility alternative is not the low-cost alternative, and the ordering information in a joint DAG is not sufficient to identify the alternative with the highest utility in excess of cost. In the preferred embodiment, these cases are identified by performing the logical AND of the buy dominance matrix and the untransposed sell dominance matrix. In the example developed earlier, plastic has both higher utility and higher cost than aluminum or ceramic, leading to the need for manual intervention; and (Test 3) Some alternatives may not be directly comparable in the price DAG from one or another of the negotiating constraint agents. In the preferred embodiment, these cases are identified by OR'ing the sell dominance matrix and its transpose, AND'ing the result with the buy dominance matrix, and taking the complement. In the example, the buyer does not provide any information on the relative utilities of aluminum and steel or plastic and steel, while the seller does not provide any information on the relative costs of steel and ceramic or aluminum and ceramic. Thus these relations must be evaluated either by eliciting more information through the automated interface, or by manual intervention.

Computer-Human Interfaces

The state of an agent-based system can be viewed as a set of variables manipulated by the agents. If human decision-makers wish to maintain some of the variables within certain limits, they can override any agent decisions that would push them out of range. In the preferred embodiment, the variable agent supports this direct control.

The variable agent monitors any incoming commands to change its value, compares the indicated value with limits set by the human decision-makers, and accepts only those commands that conform with those limits. Such an agent provides its human decision-makers with an interface that permits them to define acceptable limits, to monitor the current state of the variable, and to change the variable's assignment directly.

The present invention includes the following computer-human interface methods in order for a human decision-maker to interact with the computerized agents.

FIG. 13a depicts an interface 500 termed within the present invention as the "additive" interface. An exemplary bid space 504 is depicted which shows the overall price and quantity limits for the variable being traded (e.g. an electrical power variable). The limits may be set, for example, by the chief engineer, or may vary dynamically as the system operates, based on the state of the market, honing in as the participant shrinks the intervals on the axes. A shaded bar 508 across the bid space 504 shows the last closing price of the market for this variable.

A human decision-maker specifies a bid by manipulating price slider 512, quantity slider 516, and a bid shape indicator selector 520. The price slider 512 indicates the range of prices it is willing to pay if it is a buyer or to accept if it is a seller. The quantity slider 516 indicates the amount of the variable it wishes to trade. The bid shape selector 520 is a set of buttons used to indicate the general shape of the bid.

The current bid (at reference numeral 524) indicates the two-dimensional interval specified by the current settings of the slider buttons on price slider 512 and quantity slider 516 and the setting bid shape selector 520. Within FIG. 13a, this is depicted as rectangle 524 bounded by cursors showing the slider locations. An alternate embodiment includes a sketch (not shown) of the underlying bivariate probability distribution, reflected through density of shading or by means of contour lines indicating distance from the mean. The shape and orientation of this distribution depends on the shape selector. Its location and size reflect the setting of the sliders.

The human decision-maker presses bid button 528 to submit a bid to the market server. The market server is a computerized database which in the preferred embodiment contains the current bids and potential sets of values of the variables. In the preferred embodiment, each variable has its own market server.

The market server preferably closes on a periodic basis (e.g., every hour). Another embodiment of the present invention allows the participants through computer-human interface 500 to bid repeatedly wherein each bid replaces the previous one until the market server closes. Another embodiment of the present invention includes "graying out" the sliders and the bid button after a bid is submitted until the market server responds with the next closing price.

Referring to FIG. 13b, the present invention also includes another computer-human interface 550 termed the "base+attribute" interface. The "base+attribute" interface 550 features the following:

* the lower end of the price interval for variables is $0, since the price on variables represents additional value beyond the base;
* prices are totals, not per-unit, since the variables are not presumed to be additive;
* since the variables are not presumed to be additive, the probability densities do not need to manipulated and thus do not need to be shown to the human.

The "base+attribute" interface 550 provides the participant one pair of slider buttons (551 and 552) each for the base component and each for the sliders for the variables (i.e., RPM slider 558, torque slider 562, x-location slider 566, and y-location slider 570). In this example, the base component is a rotational shaft with its associated variables of RPM, torque, x-location, and y-location. The sliders (558, 562, 566, and 570) for the variables are used to input price information for the base component, and value ranges for the variables; the length of the spine of a slider reflects the range for variation generated by the current state of the negotiation.

One embodiment includes labeling the extreme prices (for the base component) and the values (for the variables) at the top and bottom of each spine. For example, the top price for the base component is indicated at reference numeral 574 and the lowest price at reference numeral 578.

The sliders (558, 562, 566, and 570) for the variables include the following features:

* the dynamic slider buttons (e.g., 582) can be manipulated by the participant to indicate a desired interval of variable values. In general, these can only be moved closed to one another; moving them apart incurs a penalty;
* the recommendation slider buttons (e.g., 586) are static, and represent the system's recommendation of how to adjust an interval, based on the qualitative market rules and the shape indicators that the various participants have assigned to each variable;
* prices without a frame (e.g., 590) are read-only and indicate the price increment assigned to this variable by the most recently completed transactions;

* framed prices (e.g., 594) can be changed by the participant to indicate its assessment of the incremental cost (if a buyer) or value (if a seller) of the interval indicated by the variable's sliders;
* the participant uses the variable's shape selector (e.g., 598) to indicate how the variable contribution to the base price varies over the range from $0 to the framed price (e.g., 594) as the variable's value increases over the interval bounded by the sliders.

Bid button 599 is used to submit a formulated bid to the market server. Pressing bid button 599 submits bids on the base component and all variables simultaneously, satisfying the requirement that linked markets should be manipulated concurrently (as discussed with respect to block 220 on FIG. 6*a*).

FIG. 13*c* depicts a computer-human interface 600 which is used to assist a human decision-maker in formulating sell bids for variables of interest. Bid information from computer-human interface 600 is used to provide bids to other constraint agents by preferably using the "additive" interface 500 of FIG. 13*a* or the "base+attribute" interface 550 of FIG. 13*b*.

Region 601 indicates the ranges for the following three variables which are to be purchased by another entity: output torque, output RPM, and output Horse Power (HP). Summary region 602 summarizes the values for the three variables which can be provided by the human decision-maker. Summary region 603 summarizes the sell prices which can be offered for the base components. The values of summary regions 602 and 603 are calculated based upon the detailed information provided in region 606.

Region 606 determines which assemblies satisfy the requirements specified in region 608 (as indicated in column 1 of Region 606). Moreover, region 606 can rank the assemblies from low to high or high to low based on any of the columns in the table. The minimum and maximum values of each column in region 606 are provided in summary region 607.

Task Agents

With respect to task agents 288 (FIG. 6*b*), task agents are used to overcome a disadvantage of past approaches in how long it takes an overall solution to be reached. For example, in the area of design, design time is an important part of total product cycle time, and competitiveness increasingly requires getting products to market (and thus designed) more quickly. However, sometimes a better design results if one does additional analysis or waits for other design decisions. Thus the cost of time has two parts: the cost of delay (generated by delaying final product launch) and the cost of haste (the loss of potential increased functionality). The following example focuses on a decision in the design space, but the same underlying mechanisms can be used to manage workflow in other applications, such as in a manufacturing environment.

At some point a constraint agent needs to accept the current best value for each of its variables, thus removing that variable from any subsequent buy/sell decisions by the constraint agent, and also making it read-only in subsequent computations of interactions among variables. The cost of haste in accepting the current value of a variable is the maximum marginal benefit of delaying the decision for that variable, based on the market value of its design dimension. That is, for example, if the weight variable wants to wait for an analysis that might in the best case permit it to accept a value of 3 kg instead of its current estimate of 5 kg, and if the current market price for weight is $50/kg, the cost of locking in the 5 kg value is no more than $100. Once a constraint knows how much the proposed delay will cost, it can choose between an immediate decision on that variable and the possible benefits of a delay. Some delays are unacceptable, because of the cost of time that they incur. Others yield such great improvement to the design that they can be automatically accepted. There are still others in which the human designer is invited to decide whether to delay or to accept the current best value for that variable (which removes it from any subsequent buy/sell decisions by the constraint).

To estimate the cost of delay, each constraint agent is preferably provided with a set of task agents, one corresponding to each milestone for that constraint agent. Each task agent knows its predecessors and successors. A distributed process over the resulting network of task agents informs tasks on the critical path what their deadlines are. This aspect is discussed in greater detail below.

The cost of completing a task late depends on whether it is on the critical path or not. A late task on the critical path delays the entire project by its tardiness, and generates a marginal cost equal to that delay. Even a task not on the critical path can delay the entire project if it lasts so long that its path becomes the critical path.

FIG. 14*a* shows a typical cost-of-delay graph 612 with cost as the ordinate axis and time as the abscissa axis. Graph 612 has three regions. The decreasing costs before the due date reflect the general desirability of delaying design decisions as long as possible to keep options open (first region 613). The sharply increasing costs after the due date reflect the cost of tardiness (second region 614). The convex transition region between the two provides cost signals that a task is approaching its deadline and helps designers avoid "running into the wall" (third region 618).

A designer can supply a few parameters from which cost-of-delay functions can be generated. Using such functions, each task can compute the cost of its delay. The actual cost and time values involved in the task are integrated into an overall decision support and workflow system.

By monitoring the cost estimates from its tasks, a constraint agent estimates the cost of delay, and thus makes a rational trade-off with the cost of haste in deciding whether to accept the current value of a variable or to wait for a possibly improved value. When a task does exceed its nominal due date, it taxes its constraint, thus integrating the cost of delay into the marketplace.

One embodiment of the present invention includes only promises to pay and threats to tax which guide the organization of the system, with no money actually changing hands. Another embodiment includes implementations in which money does actually flow. When taxes are imposed from task agents, the tax revenues are distributed among the constraint agents which were adversely affected by the delay.

A feature of task agents is that the entities responsible for their execution can initiate them. Then, through their autonomous interactions as agents, they generate and monitor the overall schedule that emerges from these local plans, and communicate back to the task owners a price-based message of the consequences of local plan decisions. A task owner can stay with the original plan and pay the costs dictated by the impact on the overall project schedule, or modify the plan to reduce the detrimental impact and thus reduce the cost of time felt in that local activity.

Figure 14B:
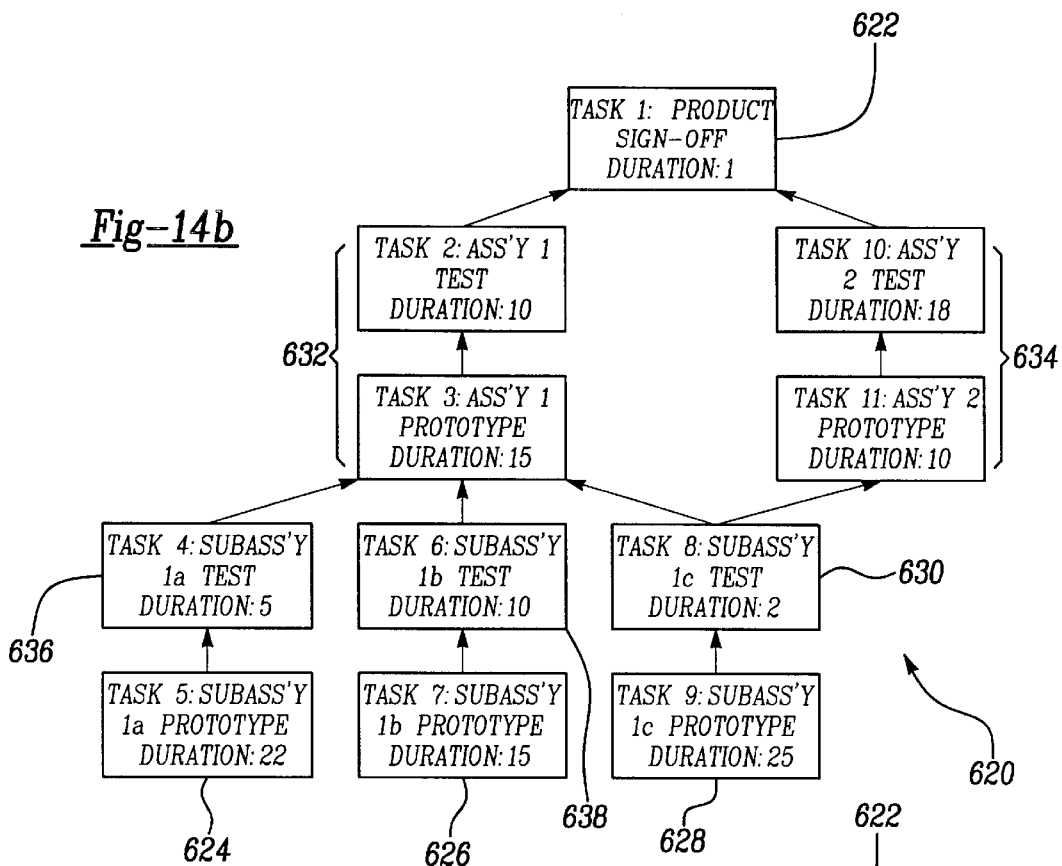
FIGS. 14b–14e are directed acyclic graphs showing the structure of task agents.

FIG. 14*b* shows a directed acyclic graph 620 which illustrates the task agent structure within the preferred embodiment of the present invention. Each task agent knows who its predecessors and successors are, and how long it is scheduled to take. Some task agents will be the leaves in this structure, with no predecessors, and they will know that they are leaves. Within this example, task agent 1 622 is the end task; task agents 5 624, 7 626 , and 9 628 are the leaves; and task 8 630 tests subassembly 1c, which is used both in tasks 2 and 3 632, which produce assembly 1, and in tasks 10 and 11 634, which produce assembly 2. Tasks 4 636 and 6 638 test subassemblies 1a and 1b, respectively, which are used in task 3 632 to prototype assembly 1. An assembly and a subassembly are used herein as exemplary components of a system.

The following distributed algorithm runs independently on each task agent, and provides each task agent with a periodically updated indication of whether or not it is on the critical path.

Figure 14C:
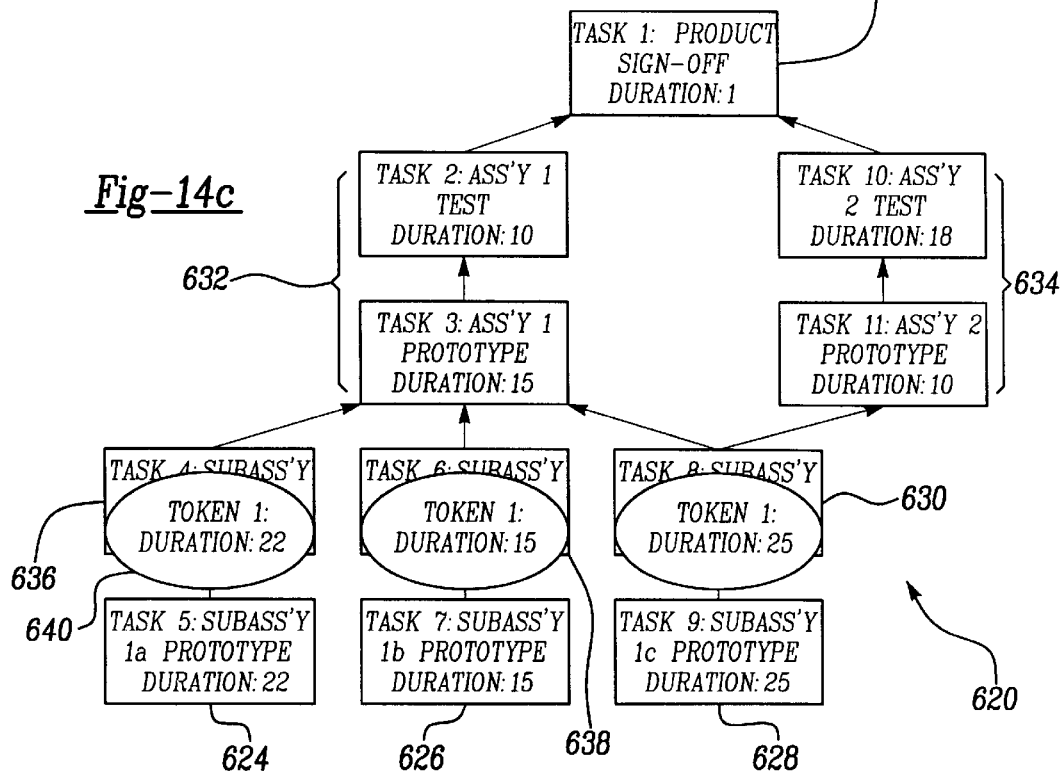

Referring to FIG. 14c, periodically, each leaf task agent (e.g., 624) sends a token (e.g., 640) to each of its successors (e.g., 636). The token is initialized with a serial number (starting with the same value in all leaf task agents), and the duration of the initiating task agent. The serial number is incremented each time a leaf sends out another token, which allows other task agents to avoid confusing tokens from different cycles.

Figure 14D:
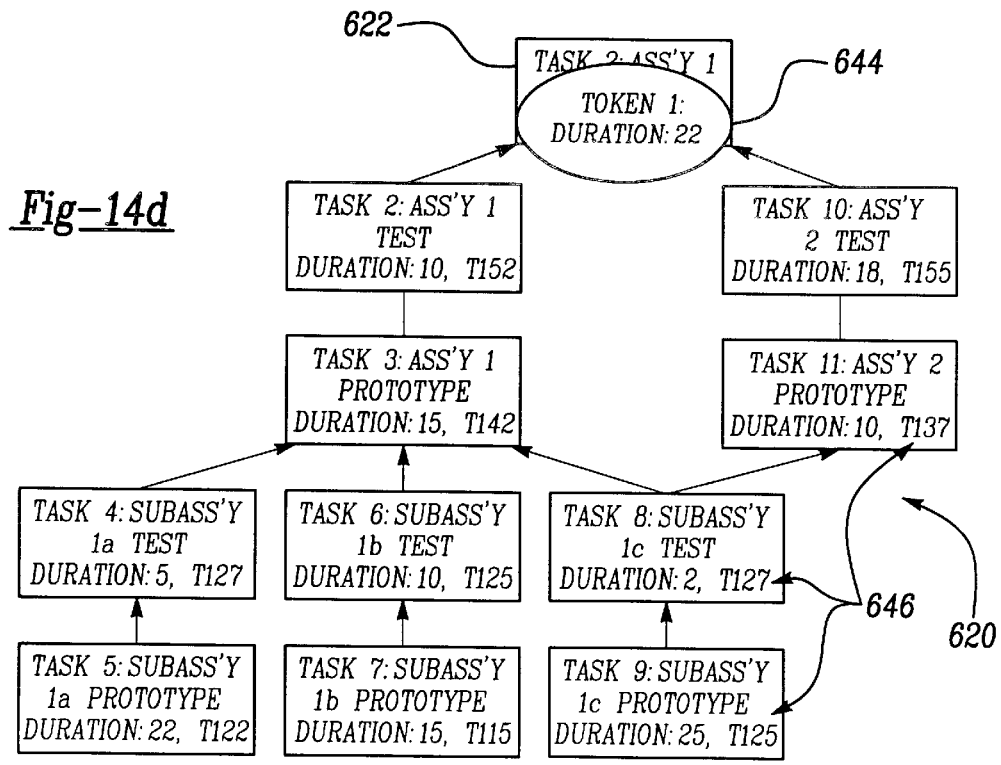

Referring to FIG. 14d, when a task agent has received the tokens of the same serial number from all of its predecessors, it selects the one with the longest duration, adds its own duration, and passes the token to its successors. In this example, token 644 is the resultant token at the end task 622. Each token accumulates the length of the path that it has traversed, and leaves a trace (as shown by reference numeral 646) of its value in the traversed task agents. For each task agent, this trace gives the value of its cumulative due date. Whenever two tokens meet (corresponding to several tasks sharing a common successor), a single token continues on its way, carrying the greatest duration of any of the lower level tokens. When the end task agent 622 receives tokens from all its predecessors, it selects the largest (eg. token 644) and reflects it back to its predecessors.

Figure 14E:
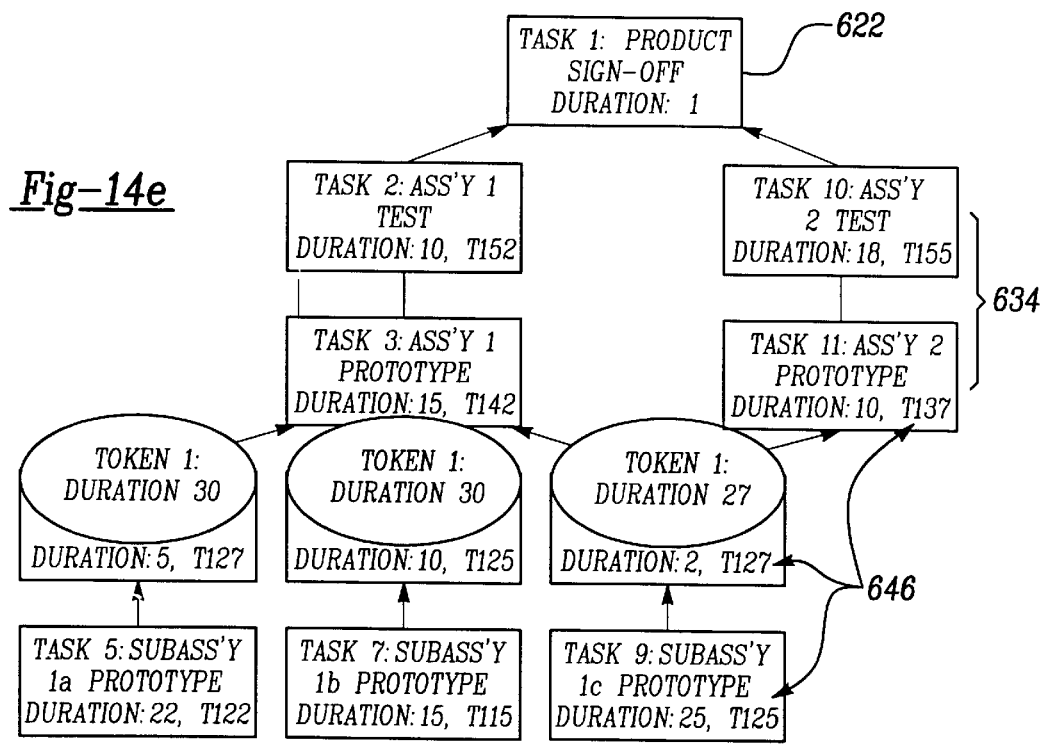

When a task agent has received a reflected token of a given serial number from all of its successors, it retains the largest. If its trace for that token is less than the duration of the token, it marks itself as not on the critical path. If its trace is the same as the token's duration, it marks itself as on the critical path. Then it decrements the token by its own duration and passes it back to its predecessors. FIG. 14e shows the state of the network after several levels of reflection. The task agents on the emerging critical path are task 1 622, and task 10 and task 11 (generally shown at 634).

Since each wave of tokens has its own serial number, a new wave can begin before the previous one has ended. Exact synchronization of clocks on leaf task agents is not necessary. If task agents pass tokens first-in-first-out (FIFO), then arrival of a token with a higher serial number while a task agent is waiting for one with a lower serial number indicates that the lower-numbered token has been lost, thus permitting the system to correct for communication errors. When a task agent sees a reflected token with a higher serial number than the one that generated its current critical path status, it revises that status.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

What is claimed is:

1. An apparatus for determining an assignment to a variable through iterative processing which converges from ranges of assignments to a single value, the apparatus comprising:
   a first constraint data structure having a first preferential rule set for determining a preferential assignment range of a first variable;
   a first computer module for determining a feasible assignment range of said first variable through an iterative adjustment of said feasible assignment range which satisfies said first preferential rule set such that said feasible assignment range converges towards a single assignment value for said first variable; and
   a protocol providing communication between said first computer module and said first constraint data structure to repeatedly communicate said feasible and preferential assignment ranges and said iterative adjustments thereof between said first constraint data structure and said first computer module until said feasible and preferential assignment ranges converge at said single assignment value for said first variable.

2. The apparatus of claim 1 wherein said first computer module is a computerized agent.

3. The apparatus of claim 1, wherein said first computer module comprises a variable agent for determining an assignment trimming criteria based upon said first preferential rule set.

4. The apparatus of claim 3, wherein said first variable agent repeatedly communicates with said first computer module and said first constraint data structure via said protocol.

5. The apparatus of claim 4, wherein said protocol includes a one-of exchange protocol and an any-of exchange protocol.

6. The apparatus of claim 3, wherein said first computer module further comprises a constraint agent for determining said feasible assignment range of said first variable which satisfies said first preferential rule set.

7. The apparatus of claim 6, wherein said variable agent provides trimming data to said constraint agent, said trimming data indicating a direction and an amount for narrowing said feasible assignment range.

8. The apparatus of claim 7, wherein said trimming data indicates said feasible assignment range maximizing a difference between a utility function and a cost function of said variable for said constraint agent.

9. The apparatus of claim 7, wherein said trimming data is based upon at least one item selected from a group of items consisting of curve shape, assignment range, price range and exchange protocol.

10. The apparatus of claim 9, wherein said trimming data is based upon a combination of at least two items selected from said group.

11. The apparatus of claim 9, wherein said first constraint data structure stores said at least one item.

12. The apparatus of claim 7, wherein said constraint agent repeatedly communicates said trimming data via said protocol to said first computer module and said first constraint data structure for narrowing said feasible assignment range of said variable.

13. The apparatus of claim 1, further comprising:
   a second constraint data structure having a second preferential rule set for determining a second preferential assignment range of a second variable, said second constraint data structure for establishing a relationship between said first variable and said second variable;

a second computer module for determining a second feasible assignment range of said second variable through an iterative adjustment of said second feasible assignment range based on said feasible assignment range and which satisfies said second preferential rule set such that said second feasible assignment range converges towards a single assignment value for said second variable;

said protocol providing communication between said first computer module, said second computer module and said second constraint data structure to repeatedly communicate said feasible and preferential assignment ranges and said iterative adjustments thereof to said apparatus until said feasible and preferential assignment ranges converge at said single assignment value for said second variable.

14. The apparatus of claim 13, wherein said first and second computer modules are computerized agents.

15. The apparatus of claim 13, wherein said second variable is an input to a third computer module, said third computer module determining a third feasible assignment range to a third variable based upon said preferential assignment range of said variable.

16. The apparatus of claim 15, wherein said second and third computer modules provide respectively a second and third bid for acquiring said variable as said input.

17. The apparatus of claim 16, wherein said first computer module includes a variable agent for providing a timing function to indicate when said second and third bids are to be processed by said first computer module.

18. The apparatus of claim 16, further comprising a variable agent for aggregating said second and third bids and providing a recommendation to said first, second, and third computer modules with respect to a price and said second preferential assignment range for said second variable.

19. The apparatus of claim 18, wherein said second and third bids each have a buy price function, each of said buy price functions representing a price to be paid by a computer object for said particular assignment to said first variable.

20. The apparatus of claim 19, wherein said buy price function of said second bid is based on trimming data provided by said second computer module and said buy price function of said third bid is based on trimming data provided by said third computer module.

21. The apparatus of claim 20, wherein said trimming data associated with said second and third computer modules indicate a relationship between said price and said second and third feasible assignment ranges for said first variable.

22. The apparatus of claim 19, wherein said buy price functions provided by said second and third computer modules are used by said first computer module to determine a difference between a utility function and a cost function for selecting between said second and third bids.

23. The apparatus of claim 22, wherein said first computer module has a sell price function representing a price to be offered to said first computer module for said feasible assignment range of said variable.

24. The apparatus of claim 23, wherein said sell price function is based upon a curve shape of said first computer module.

25. The apparatus of claim 23, wherein said utility function for providing said feasible assignment range is determined based upon said sell price function of said first computer module and upon said buy price functions of said second and third computer modules.

26. The apparatus of claim 25, further comprising a variable agent for determining a non-overlap situation based upon an evaluation of said sell price function of said first computer module and upon said buy price functions of said second and third computer modules.

27. The apparatus of claim 26, wherein said variable agent communicates a non-overlap data signal to said first, second, and third computer modules via said protocol when said variable agent determines a non-overlap situation.

28. The apparatus of claim 26, wherein said variable agent communicates a non-overlap data signal to a computer-human interface via said protocol when said variable agent determines a non-overlap situation.

29. The apparatus of claim 28, wherein said second computer module includes a human-computer interface for receiving from a human input related to said feasible assignment range of second variable by said second computer module.

30. The apparatus of claim 29, wherein said human-computer interface is an additive computer-human interface.

31. The apparatus of claim 29, wherein said human-computer interface is a base+attribute human-computer interface.

32. The apparatus of claim 13, wherein said feasible assignment ranges of said first and second variables are determined substantially simultaneously.

33. The apparatus of claim 13, wherein said second computer modules communicates a preferred buy range of assignments for said first variable to said first computer module via said protocol.

34. The apparatus of claim 33, wherein said second computer module includes a second constraint agent for determining said preferred buy range of assignments for said first variable.

35. The apparatus of claim 34, wherein said first computer module includes a first constraint agent, said second constraint agent communicating said preferred buy range of assignments to said first constraint agent.

36. The apparatus of claim 35, wherein a variable agent communicates said preferred buy range of assignments from said second constraint agent to said first constraint agent via said protocol.

37. The apparatus of claim 35, wherein said first constraint agent communicates a preferred sell range of assignments for said first variable to said second constraint agent via said protocol.

38. The apparatus of claim 37, wherein a variable agent communicates said preferred sell range of assignments from said first constraint agent to said second constraint agent via said protocol.

39. The apparatus of claim 38, wherein said preferred buy range of assignments is based upon a buy range curve shape and said preferred sell range of assignments is based upon a sell range curve shape.

40. The apparatus of claim 38, wherein said variable agent provides a narrowing recommendation to said second constraint agent based upon said preferred sell and buy ranges of assignments of said first and second constraint agents.

41. The apparatus of claim 40, wherein said first and second constraint agents each determine a degree of satisfaction ranging from 0 to 1 based upon said preferential assignment range of said variable.

42. The apparatus of claim 40, wherein said preferred buy range of assignments is based upon a buy range curve shape and said preferred sell range of assignments is based upon a sell range curve shape.

43. The apparatus of claim 42, wherein said narrowing recommendations by said variable agent are determined based upon aggregating said buy range curve shape and said sell range curve shape.

44. The apparatus of claim 40, wherein said sell range of assignments of said variable for said first constraint agent is based upon a first figure of merit.

45. The apparatus of claim 44, wherein said first figure of merit for said first constraint agent is based upon a utility function and a cost function associated with said feasible assignment range of said variable.

46. The apparatus of claim 44, wherein said first figure of merit is based upon an internal operation cost function of said first constraint agent.

47. The apparatus of claim 44, wherein said first figure of merit is based upon a net cost function of said first constraint agent in purchasing an assignment of said variable for which said first constraint agent is a buyer.

48. The apparatus of claim 44, wherein said first figure of merit is based upon an internal utility function for making an assignment of said variable for which said first constraint agent is a seller.

49. The apparatus of claim 44, wherein said first figure of merit is based upon a utility function of said first constraint agent gained by selling said variable to another constraint agent.

50. The apparatus of claim 44, wherein said first constraint data structure stores said first figure of merit.

51. The apparatus of claim 40, wherein said buy range of assignments of said variable for said second constraint agent is based upon a second figure of merit.

52. The apparatus of claim 51, wherein said second figure of merit for said second constraint agent is based upon a utility function and a cost function associated with said second feasible assignment range to said variable.

53. The apparatus of claim 52, wherein said second figure of merit is based upon an internal operation cost function of said second constraint agent.

54. The apparatus of claim 52, wherein said second figure of merit is based upon a net cost function of said second constraint agent in purchasing an assignment of said variable for which said second constraint agent is a buyer.

55. The apparatus of claim 52, wherein said second figure of merit is based upon an internal utility function for making an assignment of said variable for which said second constraint agent is a seller.

56. The apparatus of claim 52, wherein said second figure of merit is based upon a utility function of said second constraint agent gained by selling said variable to another constraint agent.

57. The apparatus of claim 52, wherein said second constraint data structure stores said second figure of merit.

58. The apparatus of claim 37, wherein said preferred sell and buy ranges of assignments of said first and second constraint agents are expressed in substantially equivalent currency units.

59. The apparatus of claim 58, wherein said currency units are a currency units of a predetermined geographical region.

60. The apparatus of claim 13, wherein said second computer module has an internal cost and an internal utility, said second computer modules acquiring an assignment to said variable from said first computer module, when an offer by said second computer module for said variable is substantially equal to a summation of said internal cost, said internal utility and an offer provided by another computer module which has offered to purchase said variable.

61. The apparatus of claim 13, wherein at least one of said first and second constraint data structures includes an implicit constraint.

62. The apparatus of claim 1, wherein said first computer module has an internal cost and an internal utility, said first computer module determining said assignment of said variable when an asking price by said first computer module for said variable is substantially equal to a summation of said internal cost, said internal utility and a price provided by another computer module which has offered to purchase said variable.

63. The apparatus of claim 1, further comprising a task agent for providing a tax on said first computer module when said first computer modules determine said preferential assignment range to said first variable in a time frame greater than a predetermined threshold.

64. The apparatus of claim 63, wherein said task agent provides a grant to said first computer module when said first computer module determines said preferential assignment range to said variable in a time frame less than a predetermined threshold.

65. The apparatus of claim 1, further comprising a task agent for providing a grant to said first computer module when said first computer module determines said preferential assignment range to said variable in a time frame less than a predetermined threshold.

* * * * *